United States Patent
Anderson et al.

(10) Patent No.: US 8,942,857 B2
(45) Date of Patent: Jan. 27, 2015

(54) METHOD AND SYSTEM FOR THERMAL LOAD MANAGEMENT IN A PORTABLE COMPUTING DEVICE

(75) Inventors: Jon James Anderson, Boulder, CO (US); Sumit Sur, Boulder, CO (US); Jeffrey A. Niemann, Boulder, CO (US); James M. Artmeier, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 448 days.

(21) Appl. No.: 13/197,171

(22) Filed: Aug. 3, 2011

(65) Prior Publication Data

US 2012/0271481 A1    Oct. 25, 2012

Related U.S. Application Data

(60) Provisional application No. 61/478,175, filed on Apr. 22, 2011.

(51) Int. Cl.
*G05D 23/19* (2006.01)
*G06F 1/32* (2006.01)
*G06F 1/20* (2006.01)

(52) U.S. Cl.
CPC .............. *G06F 1/324* (2013.01); *G06F 1/206* (2013.01); *G06F 1/3296* (2013.01)
USPC ........................... 700/299; 718/105; 713/300

(58) Field of Classification Search
CPC ............................ Y02B 60/146; Y02B 60/148
See application file for complete search history.

(56) References Cited

U.S. PATENT DOCUMENTS

| | | | |
|---|---|---|---|
| 6,047,248 A | 4/2000 | Georgiou et al. | |
| 7,831,842 B2 * | 11/2010 | Adachi et al. | 713/300 |
| 2003/0229662 A1 | 12/2003 | Luick | |
| 2005/0216775 A1 | 9/2005 | Inoue | |
| 2006/0036878 A1 | 2/2006 | Rothman et al. | |

(Continued)

FOREIGN PATENT DOCUMENTS

WO     WO 2010112045     10/2010

OTHER PUBLICATIONS

Partial International Search Report—PCT/US2012/033192—ISA/EPO—Jun. 26, 2012.

(Continued)

*Primary Examiner* — Ryan Jarrett
(74) *Attorney, Agent, or Firm* — Nicholas A. Cole

(57) ABSTRACT

Methods and systems for leveraging temperature sensors in a portable computing device ("PCD") are disclosed. The sensors may be placed within the PCD near known thermal energy producing components such as a central processing unit ("CPU") core, graphical processing unit ("GPU") core, power management integrated circuit ("PMIC"), power amplifier, etc. The signals generated by the sensors may be monitored and used to trigger drivers running on the processing units. The drivers are operable to cause the reallocation of processing loads associated with a given component's generation of thermal energy, as measured by the sensors. In some embodiments, the processing load reallocation is mapped according to parameters associated with pre-identified thermal load scenarios. In other embodiments, the reallocation occurs in real time, or near real time, according to thermal management solutions generated by a thermal management algorithm that may consider CPU and/or GPU performance specifications along with monitored sensor data.

40 Claims, 18 Drawing Sheets

(56) References Cited

U.S. PATENT DOCUMENTS

| | | |
|---|---|---|
| 2007/0198134 A1* | 8/2007 | Adachi et al. ............... 700/300 |
| 2007/0240003 A1 | 10/2007 | Watts, Jr. et al. |
| 2008/0016374 A1 | 1/2008 | Gee et al. |
| 2008/0028244 A1 | 1/2008 | Capps et al. |
| 2008/0115010 A1 | 5/2008 | Rothman et al. |
| 2010/0073068 A1 | 3/2010 | Cho et al. |
| 2010/0138530 A1 | 6/2010 | Brillhart et al. |
| 2011/0060924 A1 | 3/2011 | Khodorkovsky |
| 2011/0138395 A1 | 6/2011 | Wolfe |

OTHER PUBLICATIONS

International Search Report and Written Opinion—PCT/US2012/033192—ISA/EPO—Nov. 30, 2012.

\* cited by examiner

| DVFS Algorithm | Core 0 | Core 1 | Core N |
|---|---|---|---|
| DVFS Alg. # 1 | 600 MHz | 650 MHz | 720 MHz |
| DVFS Alg. # 2 | 550 MHz | 600 MHz | 650 MHz |
| DVFS Alg. # 3 | 450 MHz | 500 MHz | 550 MHz |
| DVFS Alg. #N | X MHz | Y MHz | Z MHz |

| DVFS Alg. | Core 0 Freq. | Core 0 Voltage | Core 1 Freq. | Core 1 Voltage | Core N Freq. | Core N Voltage |
|---|---|---|---|---|---|---|
| DVFS Alg #1 | 600 MHz | 1.3 V | 500 MHz | 2.0 V | 550 MHz | 2.0 V |
| DVFS Alg #2 | 550 MHz | 1.0 V | 450 MHz | 1.5 V | 500 MHz | 1.9 V |
| DVFS Alg #3 | 450 MHz | 0.9V | 350 MHz | 1.0 V | 400 MHz | 1.3 V |
| DVFS Alg #N | X MHz | A V | Y MHz | B V | Z MHz | C V |

400

NORMAL STATE — 305

- NORMAL MONITORING/POLLING/INTERRUPTS FROM THERMAL SENSORS
- NO THERMAL MITIGATION TECHNIQUE(S) APPLIED

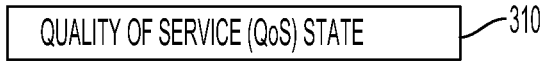
QUALITY OF SERVICE (QoS) STATE — 310

- MORE RAPID MONITORING/POLLING/INTERRUPTS FROM THERMAL SENSORS
- START APPLYING THERMAL MITIGATION TECHNIQUE(S) BUT WITH OBJECTIVE TO MAINTAIN HIGHEST PERFORMANCE AND LITTLE OR NO PERCEPTION IN QUALITY OF SERVICE TO OPERATOR OF DEVICE

SEVERE STATE — 315

- CONTINUOUS MONITORING/POLLING/INTERRUPTS FROM THERMAL SENSORS
- APPLY MORE AGGRESSIVE THERMAL MITIGATION TECHNIQUE(S) AND/OR ADDITIONAL THERMAL MITIGATION TECHNIQUES WITH PROBABLE PERCEIVABLE DEGRADATION OF PERFORMANCE BY OPERATOR OF DEVICE
- REDUCE POWER TO DEVICES (AMPLIFIERS, PROCESSORS) EXTENSIVE REALLOCATION OF PROCESSING LOADS

CRITICAL STATE — 320

- SHUT DOWN NON-ESSENTIAL DEVICES!!
- MAINTAIN ONLY E911 AND GPS FUNCTIONS

*FIG. 9*

METHOD AND SYSTEM FOR THERMAL LOAD MANAGEMENT IN A PORTABLE COMPUTING DEVICE

PRIORITY AND RELATED APPLICATIONS

This patent application claims priority under 35 U.S.C. §119(e) to U.S. Provisional Patent Application Ser. No. 61/478,175 filed on Apr. 22, 2011, entitled, "METHOD AND SYSTEM FOR THERMAL LOAD MANAGEMENT IN A PORTABLE COMPUTING DEVICE," the entire contents of which are hereby incorporated by reference.

DESCRIPTION OF THE RELATED ART

Portable computing devices (PCDs) are becoming necessities for people on personal and professional levels. These devices may include cellular telephones, portable digital assistants (PDAs), portable game consoles, palmtop computers, and other portable electronic devices.

One unique aspect of PCDs is that they typically do not have active cooling devices, like fans, which are often found in larger computing devices such as laptop and desktop computers. Instead of using fans, PCDs may rely on the spatial arrangement of electronic packaging so that two or more active and heat producing components are not positioned in close proximity to one another. When two or more heat producing components are suitably spaced from one another within a PCD, then heat generated from the operation of each component may not negatively impact the operation of the other. Moreover, when a heat producing component within a PCD is physically isolated from other components within the device, the heat generated from the operation of the heat producing component may not negatively impact other surrounding electronics. Many PCDs may also rely on passive cooling devices, such as heat sinks, to manage thermal energy among the electronic components which collectively form a respective PCD.

The reality is that PCDs are typically limited in size and, therefore, room for components within a PCD often comes at a premium. As such, there just typically isn't enough space within a PCD for engineers and designers to mitigate thermal degradation or failure through the leveraging of spatial arrangements or placement of passive cooling components.

Currently, when a PCD approaches a critical temperature, the operating system is designed to cool the PCD by simply shutting down most of the electronic components within the PCD which are generating the excessive thermal energy. While shutting down electronics may be an effective measure for avoiding the generation of excessive thermal energy within a PCD, such drastic measures inevitably impact performance of a PCD and, in some cases, may even render a PCD functionally inoperable for a period time.

Accordingly, what is needed in the art is a method and system for thermal load management in a PCD that will promote cooling of components within the PCD without over-impacting its performance and functionality.

SUMMARY OF THE DISCLOSURE

Various embodiments of methods and systems for controlling and/or managing thermal energy generation on a portable computing device are disclosed. Because temperature readings may correlate to a process load within a thermal energy generating component, one such method involves placing a temperature sensor proximate to a thermal energy generating component of a chip in a portable computing device and then monitoring, at a first rate, temperature readings generated by the temperature sensor. Based on the detection of a first monitored temperature reading which may indicate that a processing area within the component, such as a high power density sub-processor area, has exceeded a temperature threshold, the method reallocates a portion of the process load running on the first processing area of the component to a second processing area of the component. Advantageously, because a processing workload has been spread across a larger processing area giving it a lower power density, reallocation of the process load portion serves to lower the amount of energy generated in any unit area of the component over a unit of time. Although user experience may suffer due to reduced quality of service ("QoS") associated with the lower power density second processing area, critically high temperatures concentrated in high power density processing areas may be avoided.

Exemplary methods may further comprise steps for subsequent reallocation of the process load from the second processing area to the first processing area when a second monitored temperature reading indicates that the component has cooled. Advantageously, by making the second reallocation of process load after indication that the component has cooled, whether such load represents the process load that was initially reallocated from the first processing area or new processing loads queued for initial allocation, the QoS associated with the portable computing device can be returned to preferred levels.

Exemplary embodiments leverage temperature sensors strategically placed within a PCD near known thermal energy producing components such as, but not limited to, central processing unit ("CPU") cores, graphical processing unit ("GPU") cores, power management integrated circuits ("PMIC" or "PMICs"), power amplifiers, etc. Temperature signals generated by the sensors may be monitored and used to trigger drivers running on the processing units to cause the reallocation of processing loads correlating with a given component's excessive generation of thermal energy. In some embodiments, the processing load reallocation is mapped according to parameters associated with pre-identified thermal load scenarios. In other embodiments, the processing load reallocation occurs in real time, or near real time, according to thermal management solutions generated by a thermal management algorithm that may consider CPU and/or GPU performance specifications along with real time temperature sensor data.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

FIG. 9 is a diagram illustrating exemplary thermal mitigation techniques that may be applied or ordered by the thermal policy manager;

DETAILED DESCRIPTION

Figure 1:
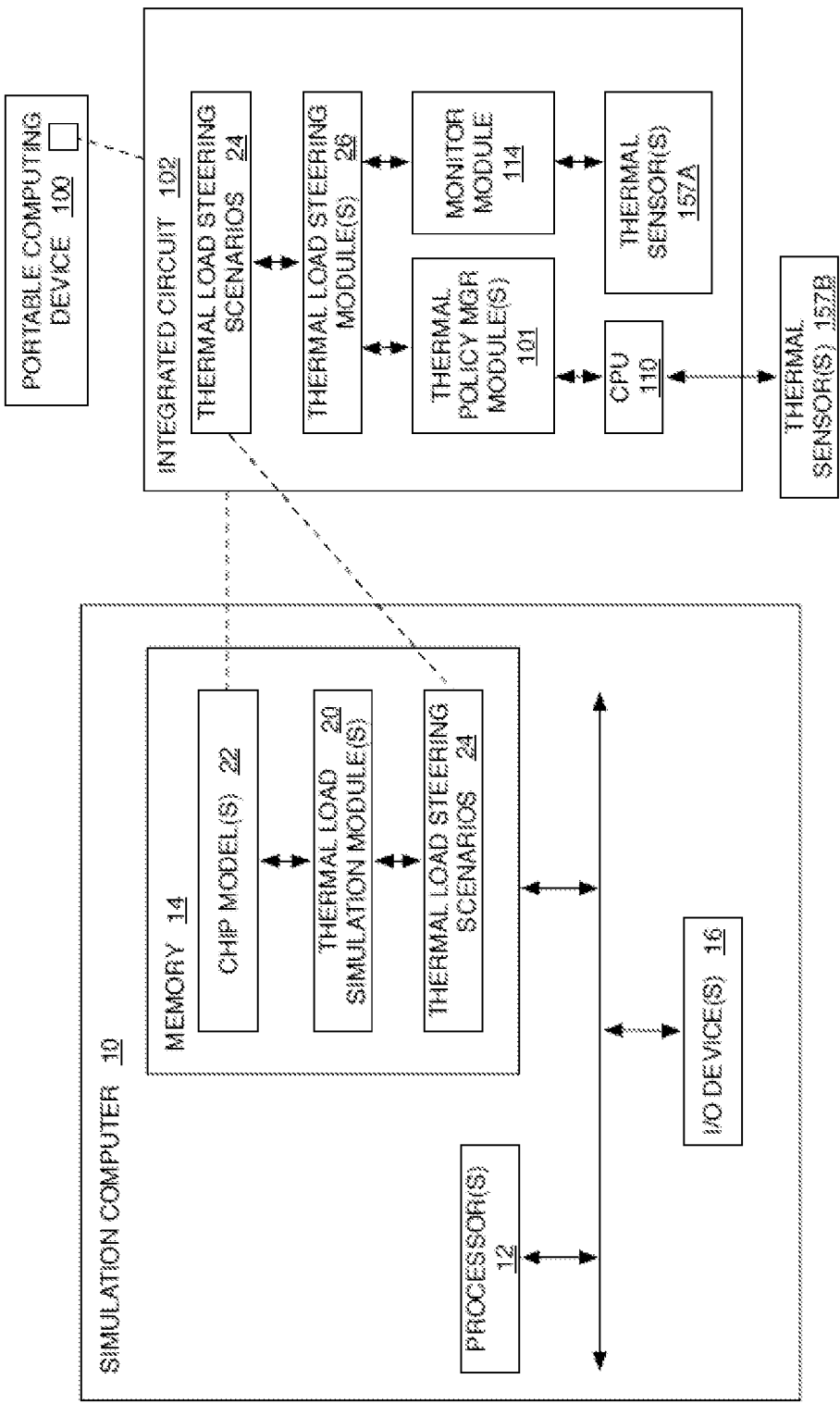
FIG. 1 is a functional block diagram illustrating an embodiment of a computer system for simulating thermal load distributions in a portable computing device ("PCD") and generating data for enabling the PCD to control the distribution of the thermal load.

The word "exemplary" is used herein to mean "serving as an example, instance, or illustration." Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content," as referred to herein, may also include files that are not executable in nature, such as documents that may need to be opened or other data files that need to be accessed.

As used in this description, the terms "component," "database," "module," "system," "thermal energy generating component," "processing component" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communication device" and "wireless handset" are used interchangeably. With the advent of third generation ("3G") and fourth generation ("4G") wireless technology, greater bandwidth availability has enabled more portable computing devices with a greater variety of wireless capabilities.

In this description, the terms "central processing unit ("CPU")," "digital signal processor ("DSP")," and "chip" are used interchangeably.

In this description, it will be understood that the terms "thermal" and "thermal energy" may be used in association with a device or component capable of generating or dissipating energy that can be measured in units of "temperature." Consequently, it will further be understood that the term "temperature," with reference to some standard value, envisions any measurement that may be indicative of the relative warmth, or absence of heat, of a "thermal energy" generating device or component. For example, the "temperature" of two components is the same when the two components are in "thermal" equilibrium.

In this description, the terms "workload," "process load" and "process workload" are used interchangeably and generally directed toward the processing burden, or percentage of processing burden, associated with a given processing component in a given embodiment. Further to that which is defined above, a "processing component" or "thermal energy generating component" may be, but is not limited to, a central processing unit, a graphical processing unit, a core, a main core, a sub-core, a processing area, a hardware engine, etc. or any component residing within, or external to, an integrated circuit within a portable computing device. Moreover, to the extent that the terms "thermal load," "thermal distribution," "thermal signature," "thermal processing load" and the like are indicative of workload burdens that may be running on a processing component, one of ordinary skill in the art will acknowledge that use of these "thermal" terms in the present disclosure may be related to process load distributions and burdens.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, among others.

FIG. 1 illustrates an embodiment of a computer system for implementing various features related to thermal load management or "steering" in a PCD 100. In general, the computer system employs two main phases: (1) a simulation phase performed by a simulation computer 10; and (2) an operational phase performed by a PCD 100.

The simulation phase involves simulating thermal loads to be experienced by an integrated circuit 102 during operation of the PCD 100. The simulation computer 10 identifies thermal load conditions produced by the PCD 100 under simulated workloads. The simulated workloads may be associated with the running of a specific application or "use case" on a given PCD 100 or, alternatively, may not be associated with any specific or predictable processing load scenario.

The simulation computer 10 may determine that a simulated thermal load distribution or "hotspot" on the silicon die may compromise user experience of PCD 100 or become otherwise detrimental to the functionality of PCD 100. Notably, as thermal energy dissipation may be increased when processing loads are concentrated in a given component, thereby potentially impacting PCD 100 performance and/or user experience, thermal energy generation can be mitigated by reallocation of processing load across complimentary components. The simulation computer 10 improves the PCD 100 performance and user experience by "steering" or reallocating all or a portion of the processing load from a first simulated location on the silicon die to a second simulated location that is available for processing. The second simulated location may be represented in commands, instructions, or any other suitable computer readable data (referred to as "thermal load steering parameter(s)") that may be provided to and used by the PCD 100 during the operational phase to steer the processing load to the second simulated location.

Moreover, in some embodiments, the preferred proximity of a likely hotspot to a sensor may be within a 5 degree Celsius range. That is, because temperature associated with a heat wave which has propagated from a hotspot will be lower as the distance to the hotspot is increased, and because there is inevitably a time lag between the time a hotspot begins to occur and the time that a temperature increase may be detected at a distance away from the hotspot, it may be preferred in some embodiments that a temperature sensor be placed at a distance from a hotspot that is predicted to correlate with a 5 degree Celsius drop in temperature. However, it will be understood that, although placement of temperature sensors within various embodiments may present novel aspects for such embodiments, the various embodiments and their equivalents are not limited to the placement of a temperature sensor in a location that is 5° C. from a known hotspot or thermal energy generating component. That is, in some embodiments, it is envisioned that the sensors may be located closer to, or farther away from, a known hotspot or thermal energy generating component than 5° C.

Referring to FIG. 1, the simulation computer 10 comprises one or more processors 12, a memory 14, and one or more input/output devices 16 in communication with each other via a local interface. The memory 14 comprises a computer model 22 of the integrated circuit 102 used in the PCD 100. The computer model 22 is a data representation of the various hardware and software components in the PCD 100 and the spatial arrangement, architecture, and operation of the various components of the integrated circuit 102, including, for example, thermal sensors 157 and a CPU 110. A detailed exemplary embodiment of a PCD 100 is described below in more detail with reference to FIGS. 6, 7A, 7B and 14. It should be appreciated that any PCD 100 and/or integrated circuit 102 may be modeled and represented in the computer model 22 provided to the simulation computer 10. The computer model 22 may comprise information such as, but not limited to, dimensions, size, and make-up of the printed circuit board ("PCB") stack, the amount of metal in traces, the sizes of the traces, the use of thermal bias, power load per sub block of the silicon die, power load per component on the PCB, use case specifics of the power load, any temporal dynamics of the power load, and other similar information as understood by one of ordinary skill in the art.

The thermal load simulation module(s) 20 interfaces with the computer model 22 and generally comprises the logic for performing the thermal load simulations based on the computer model 22. The thermal load simulation module(s) 20 generates the thermal load steering parameters 46 and stores them in, for example, the thermal load steering scenarios table 24, which is provided to the PCD 100. As illustrated in the embodiment of FIG. 1, the PCD 100 generally comprises thermal load steering module(s) 26, thermal policy manager module(s) 101, a monitor module 114, a central processing unit 110, one or more thermal sensors 157A located on the integrated circuit 102, and one or more thermal sensors 157B located off the integrated circuit 102. The thermal load steering module(s) 26 generally comprises the logic for monitoring the operations to be performed by the PCD 100 and determining whether thermal load steering should be performed. If thermal load steering is to be performed, the thermal load steering module(s) 26 accesses the thermal load steering scenarios table 24, interprets the thermal load steering parameter(s) 46, and schedules the workload in such a way to steer the processing load associated with the thermal load to underutilized, lower temperature or otherwise available processing capacity. Advantageously, such embodiments that leverage thermal load steering parameter(s) to reallocate a processing load to open processing capacity may realize the benefit of lower temperatures resulting from the reallocation.

One of ordinary skill in the art will recognize that the purpose of the thermal load steering parameter(s) 46 in some embodiments may further include provision of instructions to the thermal load steering module(s) 26 for steering a thermal load to a location near a certain thermal sensor or sensors 157. That is, it is envisioned that some embodiments may generate thermal load steering parameter(s) for the purpose of steering a processing load, which correlates to a given thermal load signature, to available processing capacity nearer a sensor 157. Advantageously, such embodiments that leverage thermal load steering parameter(s) to reallocate a processing load to open processing near a sensor may realize more accurate temperature measurement, thus leading to more efficient reallocation of processing load.

As a non-limiting example of how thermal energy dissipation may be managed via reallocation of processing loads, an embodiment that includes a CPU 110 having main processing blocks and higher performing, specialized sub-processor blocks, may have main processing blocks that represent ¾ of the CPU 110 area and sub-processor blocks that represent the remaining ¼ of the CPU area. The main processor blocks may have an associated power density ("PD") that dissipates ½ the total power of the overall CPU 110 while the sub-processor blocks also have an associated power density that dissipates ½ the total power. In such an exemplary case, one skilled in the art will recognize that the sub-processor blocks, which provide increased computational power to the overall CPU 110, represent a power density that is over twice that of the larger main processing blocks [PDsub=(P/2)/(A/4)=2 P/A; PDmain=(P/2)/(3A/4)=⅔ of P/A] and, because power density is directly proportional to the generation of thermal energy, for a given processing load will cause generation and dissipation of more thermal energy than a main processing block. As such, embodiments that utilize thermal load steering parameter(s) to reallocate processing loads from one component to another, such as, for example, from a sub-processor block of CPU 110 to a main processor block of CPU 110, may realize the benefit of lower thermal energy dissipation for a relatively minor tradeoff of processing performance or Quality of Service ("QoS"). The main processor blocks may process the load more slowly, thus translating to a lower QoS, but dissipate less thermal energy than the sub-processors. Various benefits, features and aspects of managing thermal loads through the reallocation processing loads from one area to another within CPU 110, or the like, is explained in more detail relative to FIGS. 8-14.

Returning to the thermal load steering module(s) 26, it should be appreciated that the thermal load steering module (s) 26 may communicate with (or be integrated with one or more of) the thermal policy manager module(s) 101, the monitor module 114, the CPU 110, or any other hardware or software components of the PCD 100.

Figure 2:
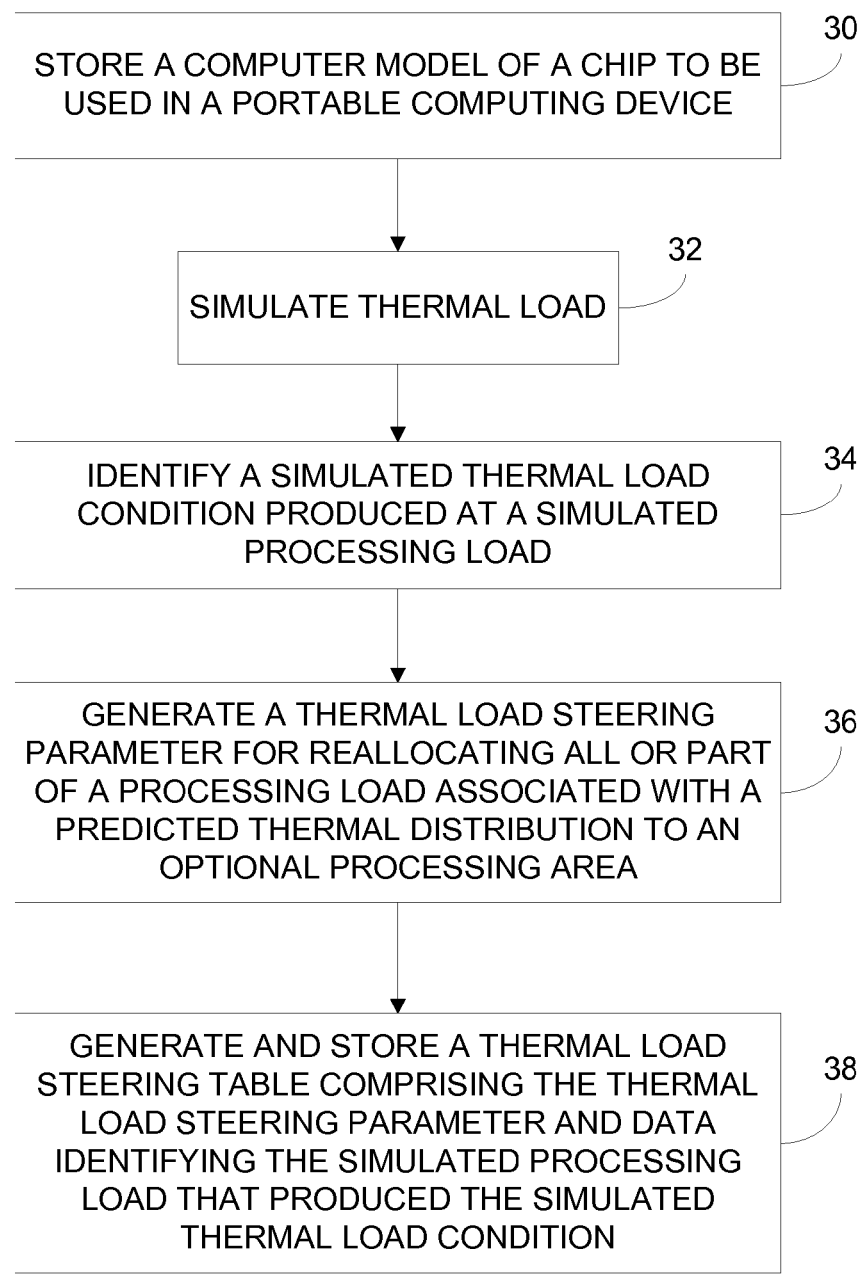
FIG. 2 is a logical flowchart illustrating an embodiment of a method for generating the thermal load steering table of FIG. 1 for use by the PCD to control the distribution of thermal load.

FIG. 2 illustrates a method 28 implemented by the simulation computer 10. In an embodiment, the method 28 may be performed during the design and development of the integrated circuit 102 and the PCD 100 so that the devices may be appropriately configured to support the thermal load steering features. In other embodiments, the method 28 may be performed after the PCD 100 has been manufactured, in which case the thermal load steering feature may be enabled through appropriate software upgrades.

Figure 4:
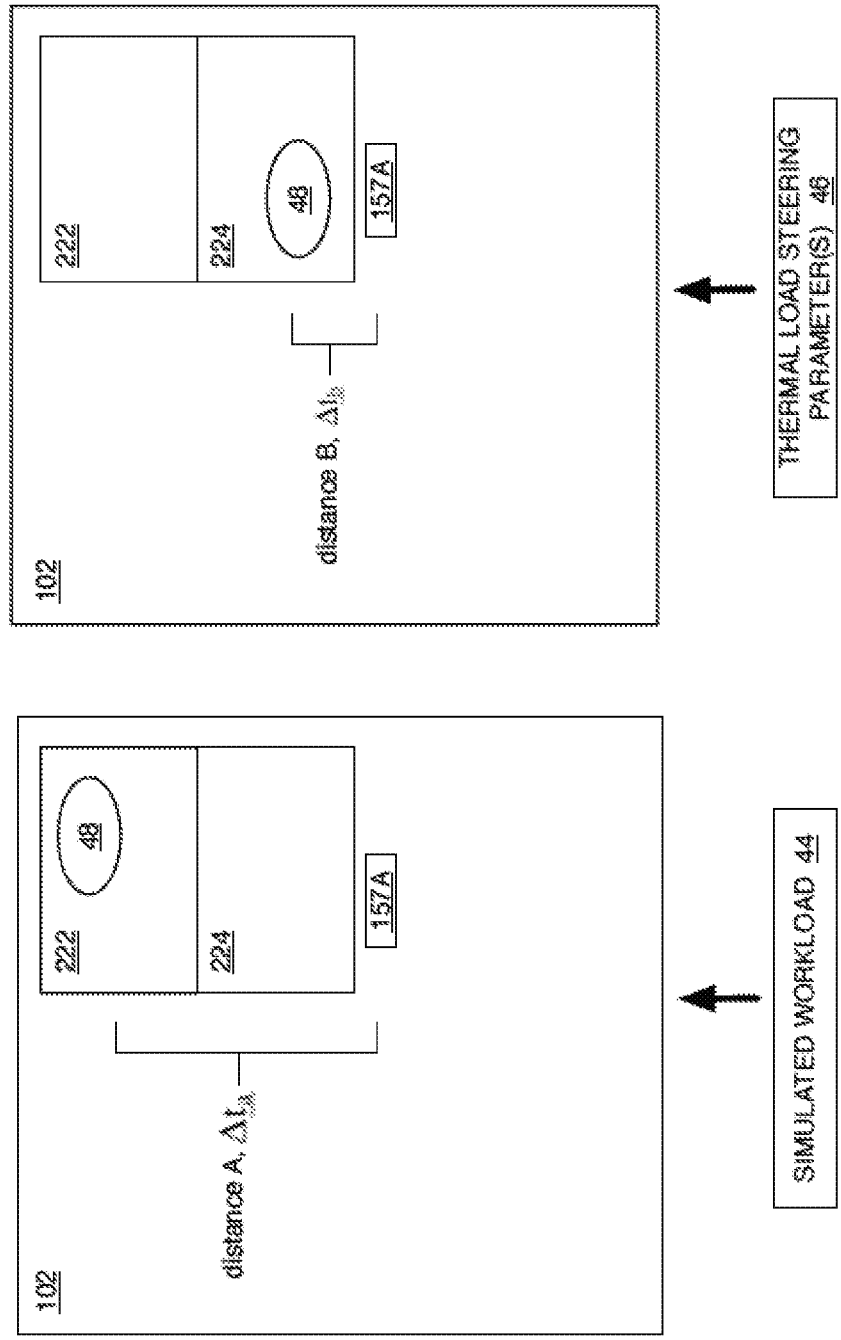
FIG. 4A is an overhead schematic diagram of the spatial arrangement of an exemplary integrated circuit illustrating a thermal load distribution under a simulated workload.
FIG. 4B illustrates the integrated circuit of FIG. 4A in which the thermal load distribution is distributed to a location closer to a thermal sensor according to the thermal load steering parameters in the thermal load steering table of FIG. 3.
Figure 7A:
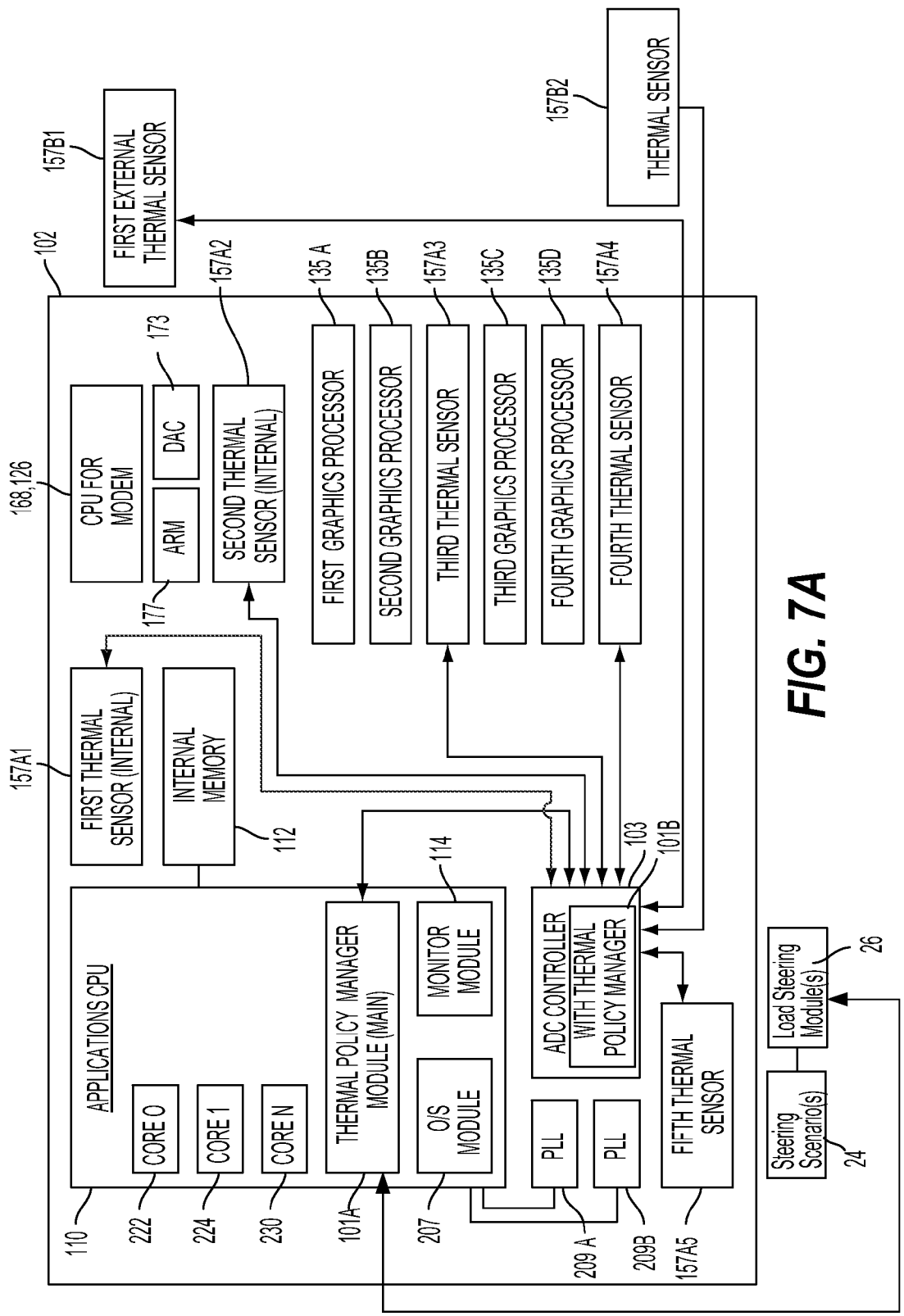
FIG. 7A is a functional block diagram illustrating an exemplary spatial arrangement of hardware for the chip illustrated in FIG. 6.

At block 30, the computer model 22 of the integrated circuit 102 is stored in the simulation computer 10 and accessed by the thermal load simulation module(s) 20. At block 32, computer simulation(s) are performed and one or more simulated thermal load conditions are identified (block 34). As known by one of ordinary skill in the art and illustrated in the example of FIG. 4A, a thermal load condition comprises a spatial thermal load distribution or "hotspot" 48 produced on the integrated circuit 102 under a simulated workload 44. The hotspot 48 as illustrated in FIG. 4A may be located on a first core 222 (FIG. 7A). As understood by one of ordinary skill in the art, measuring thermal energy (i.e.— temperature) of the hotspot 48 with a temperature sensor 157A at a point that is some distance from the hotspot 48 may be difficult due to the thermal wave moving across the surface of an object (i.e.—the computer chip or printed circuit board). The position of sensor 157A, which is at some distance relative to the hotspot 48, may not have the same temperature as the hotspot 48 itself However, as described above, placement of the sensors proximate to components known to dissipate significant amounts of thermal energy, such as within 5° C. of the likely hotspot center, may provide data useful for more efficient reallocation of processing loads.

To improve the effectiveness and accuracy of thermal load management algorithms, the simulation computer 10 may determine that the processing load associated with hotspot 48, or a portion of the processing load associated with hotspot 48, should be reallocated to an underutilized or available processing area. Based on the computer model 22, the simulation computer 10 may determine that at least a portion of the simulated workload 44 may be handled by a second core 224 instead of the first core 222, thereby mitigating potential thermal energy dissipation by spreading the processing load across the two cores 222, 224.

Figure 3:
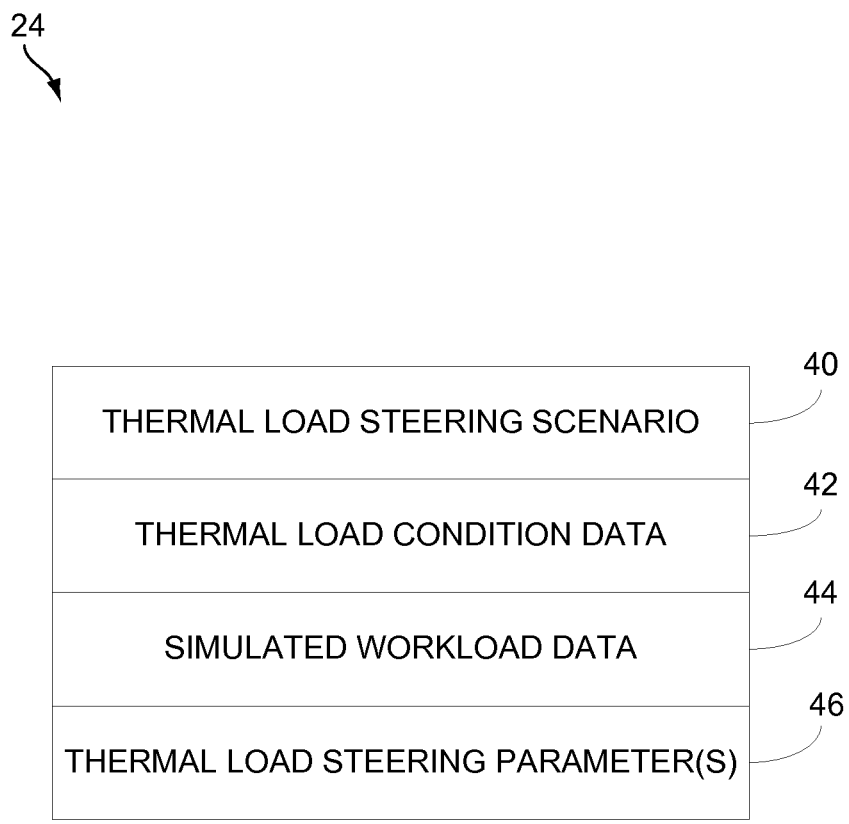
FIG. 3 is a data diagram illustrating an embodiment of the thermal load steering table of FIG. 1.

At block 36, the appropriate thermal load steering parameters 46 are generated for moving the processing load associated with hotspot 48 to a location on the second core 224 (see FIG. 4B). At block 38, the simulation computer 10 generates and stores the thermal load steering scenarios table 24 in the memory 14. As illustrated in FIG. 3, the thermal load steering scenarios table 24 may comprise a scenario 40 for each simulated thermal load condition with corresponding data such as, but not limited to, thermal load condition data 42, simulated workload data 44, and the thermal load steering parameter(s) 46. The load condition data, simulated workload data 44, and thermal load steering parameters(s) 46 may include, but are not limited to, separate use case breakdowns of power dissipation per power consuming (i.e.—heat generating) component, location of these dissipation points both on chip and off chip, expected amount of millions of instructions per second ("MIPS") per processor for a given use, total power dissipated on chip, total power dissipated by entire device, and other similar information as understood by one of ordinary skill in the art.

Figure 5:
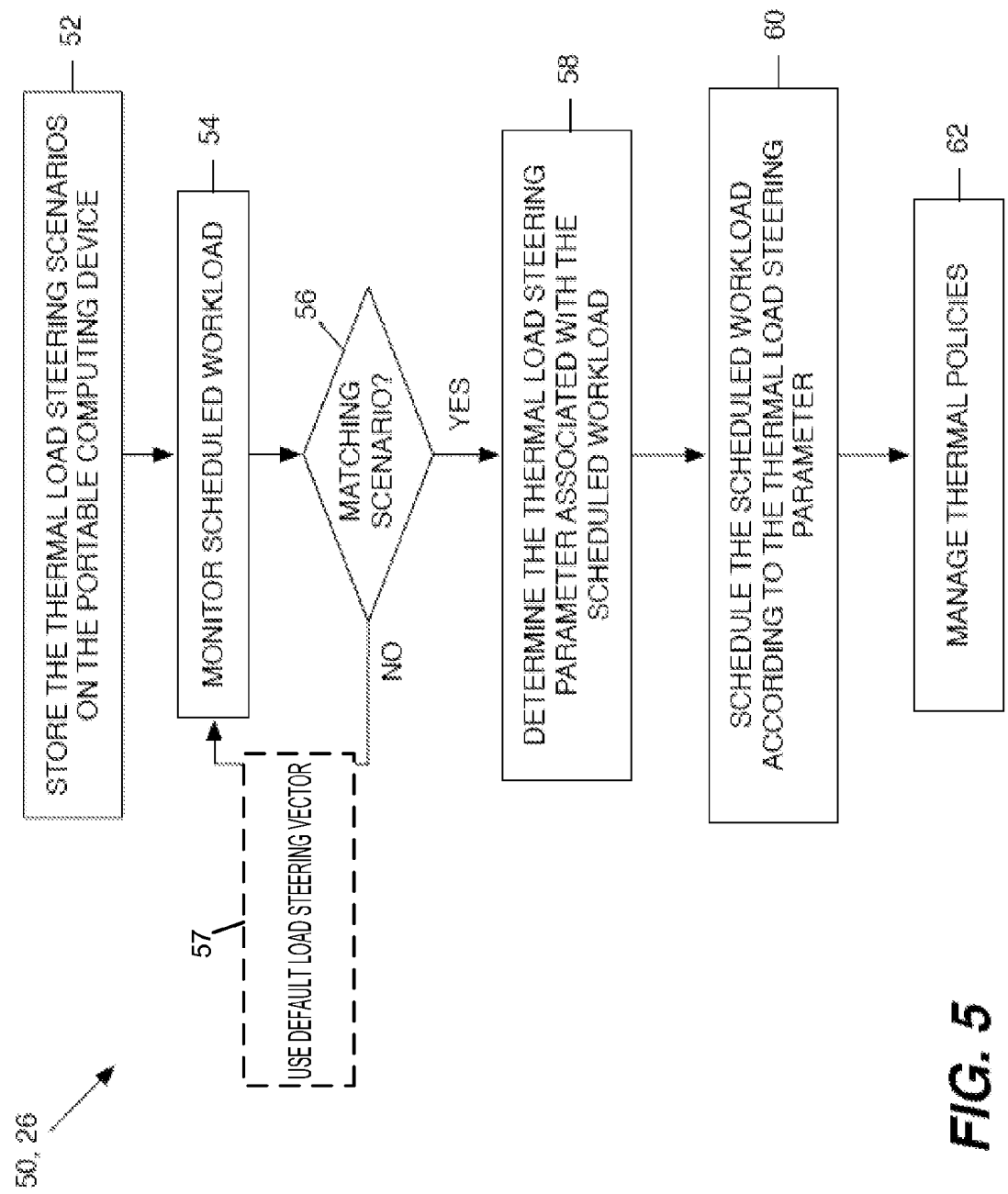
FIG. 5 is a logical flowchart illustrating an embodiment of a method for controlling thermal load distribution in the PCD of FIG. 1.

In the operational phase, the thermal load steering scenarios table 24 is provided to the PCD 100. FIG. 5 illustrates an embodiment of a method 50 implemented by the PCD 100 for performing thermal load steering. At block 52, the thermal load steering scenarios table 24 is stored in memory in the PCD 100. At block 54, the thermal load steering module(s) 26 monitors scheduled workloads for the PCD 100. In an embodiment, the monitoring may be performed by interfacing with an O/S scheduler 207 (See FIGS. 7A-7B), which receives and manages requests for hardware resources on the PCD 100. By monitoring the O/S scheduler requests, the thermal load steering module(s) 26 may compare the scheduled workloads to the simulated workload data 44 to determine if it matches one of the scenarios 40 in the table 24. If the scheduled workload matches a scenario 40 (decision block 56), the corresponding thermal load steering parameter(s) 46 may be obtained from the table 24 (block 58) and used to schedule, or otherwise reallocate, the workload on the PCD 100 (block 60).

If the scheduled workload does not match a scenario 40, then the "NO" branch from decision block 56 may be followed to optional block 57. In optional block 57, a default load steering vector may be accessed and used by the thermal load steering module 26 if the scheduled workload does not match a scenario 40. Alternatively, optional block 57 may be skipped in which the "NO" branch is followed back to decision block 56.

As mentioned above, when the workload is scheduled according to the thermal load steering parameter(s) 46, the resulting thermal load may be mitigated by more thermally efficient allocation of processing load across the PCD 100. At block 62, the PCD 100 may initiate any desirable thermal management policies.

Figure 6:
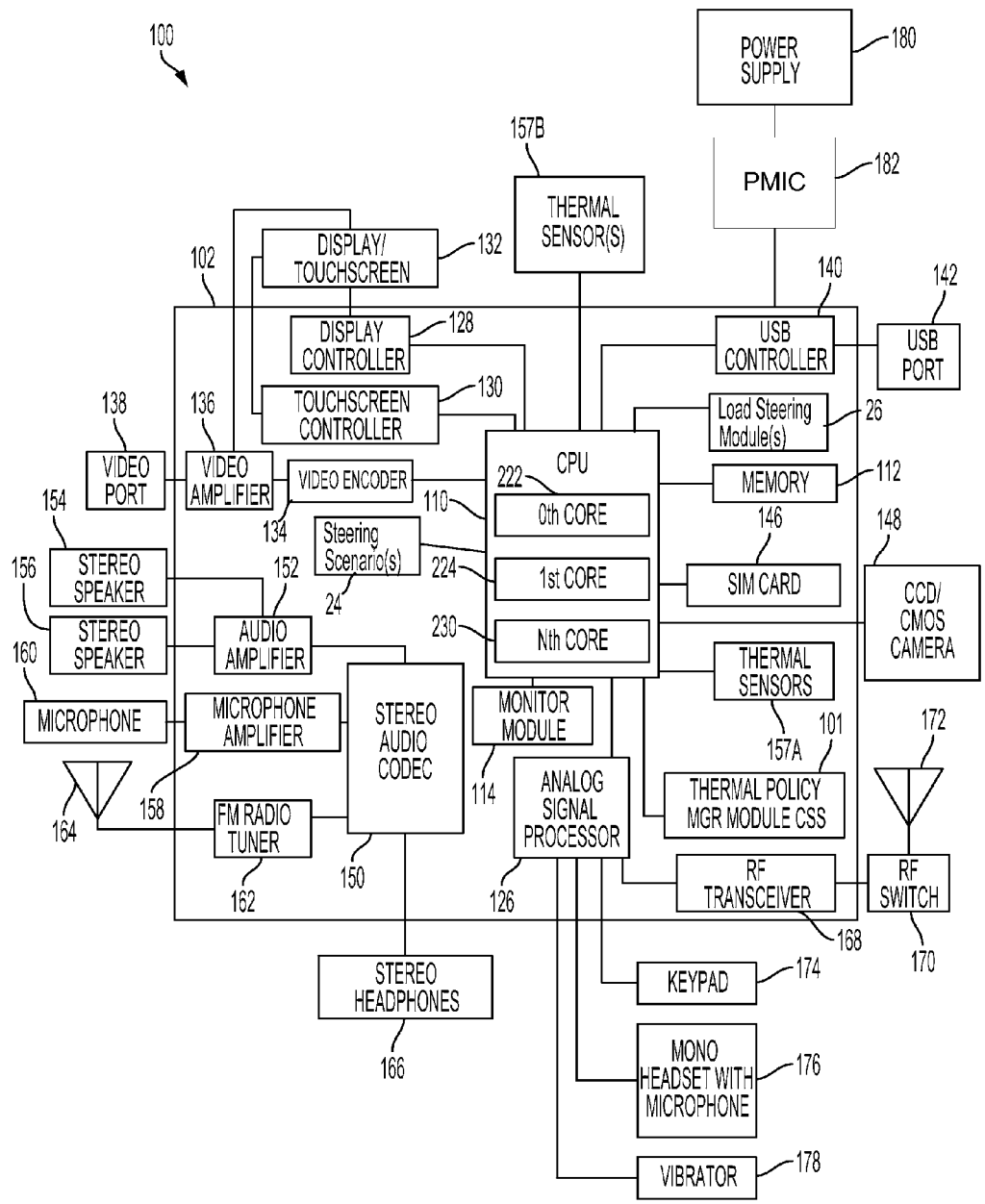
FIG. 6 is a functional block diagram illustrating an exemplary embodiment of the PCD of FIG. 1.

Examples of various alternative embodiments of the PCD 100 and thermal management policies are described below in connection with FIGS. 6-14. FIG. 6 is a functional block diagram of an exemplary, non-limiting aspect of a PCD 100 in the form of a wireless telephone for implementing methods and systems for monitoring thermal conditions and managing thermal policies. Per some embodiments, PCD 100 may be configured to manage thermal load associated with graphics processing. As shown, the PCD 100 includes an on-chip system 102 that includes a multi-core central processing unit ("CPU") 110 and an analog signal processor 126 that are coupled together. The CPU 110 may comprise a zeroth core 222, a first core 224, and an Nth core 230 as understood by one of ordinary skill in the art. Further, instead of a CPU 110, a digital signal processor ("DSP") may also be employed as understood by one of ordinary skill in the art.

In general, the thermal policy manager module(s) 101 may be responsible for monitoring and applying thermal policies that include one or more thermal mitigation techniques that may help a PCD 100 manage thermal conditions and/or thermal loads and avoid experiencing adverse thermal conditions, such as, for example, reaching critical temperatures, while maintaining a high level of functionality.

FIG. 6 also shows that the PCD 100 may include a monitor module 114. The monitor module 114 communicates with multiple operational sensors (e.g., thermal sensors 157) distributed throughout the on-chip system 102 and with the CPU 110 of the PCD 100 as well as with the thermal policy manager module 101. The thermal policy manager module 101 may work with the monitor module 114 to identify adverse thermal conditions and apply thermal policies that include one or more thermal mitigation techniques as will be described in further detail below.

As illustrated in FIG. 6, a display controller 128 and a touch screen controller 130 are coupled to the digital signal processor 110. A touch screen display 132 external to the on-chip system 102 is coupled to the display controller 128 and the touch screen controller 130.

PCD 100 may further include a video encoder 134, e.g., a phase-alternating line ("PAL") encoder, a sequential couleur avec memoire ("SECAM") encoder, a national television system(s) committee ("NTSC") encoder or any other type of video encoder 134. The video encoder 134 is coupled to the multi-core central processing unit ("CPU") 110. A video amplifier 136 is coupled to the video encoder 134 and the touch screen display 132. A video port 138 is coupled to the video amplifier 136. As depicted in FIG. 6, a universal serial bus ("USB") controller 140 is coupled to the CPU 110. Also, a USB port 142 is coupled to the USB controller 140. A memory 112 and a subscriber identity module (SIM) card 146 may also be coupled to the CPU 110. Further, as shown in FIG. 6, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 6, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 6 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 6 further indicates that a radio frequency ("RF") transceiver 168 may be coupled to the analog signal processor 126. An RF switch 170 may be coupled to the RF transceiver 168 and an RF antenna 172. As shown in FIG. 6, a keypad 174 may be coupled to the analog signal processor 126. Also, a mono headset with a microphone 176 may be coupled to the analog signal processor 126. Further, a vibrator device 178 may be coupled to the analog signal processor 126. FIG. 6 also shows that a power supply 180, for example a battery, is coupled to the on-chip system 102. In a particular aspect, the power supply includes a rechargeable DC battery or a DC power supply that is derived from an alternating current ("AC") to DC transformer that is connected to an AC power source.

The CPU 110 may also be coupled to one or more internal, on-chip thermal sensors 157A as well as one or more external, off-chip thermal sensors 157B. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157B may comprise one or more thermistors. The thermal sensors 157 may produce a voltage drop that is converted to digital signals with an analog-to-digital converter ("ADC") controller 103 (See FIG. 7A). However, other types of thermal sensors 157 may be employed without departing from the scope of the invention.

The thermal sensors 157, in addition to being controlled and monitored by an ADC controller 103, may also be controlled and monitored by one or more thermal policy manager module(s) 101. The thermal policy manager module(s) may comprise software which is executed by the CPU 110. However, the thermal policy manager module(s) 101 may also be formed from hardware and/or firmware without departing from the scope of the invention. The thermal policy manager module(s) 101 may be responsible for monitoring and applying thermal policies that include one or more thermal mitigation techniques that may help a PCD 100 avoid critical temperatures while maintaining a high level of functionality.

Briefly referring back to FIG. 1, FIG. 1 also shows that the PCD 100 may include a monitor module 114. The monitor module 114 communicates with multiple operational sensors distributed throughout the on-chip system 102 and with the CPU 110 of the PCD 100 as well as with the thermal policy manager module 101. The thermal policy manager module 101 may work with the monitor module to apply thermal policies that include one or more thermal mitigation techniques as will be described in further detail below.

Returning to FIG. 6, the touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, thermal sensors 157B, and the power supply 180 are external to the on-chip system 322. However, it should be understood that the monitor module 114 may also receive one or more indications or signals from one or more of these external devices by way of the analog signal processor 126 and the CPU 110 to aid in the real time management of the resources operable on the PCD 100.

In a particular aspect, one or more of the method steps described herein may be implemented by executable instructions and parameters stored in the memory 112 that form the one or more thermal policy manager module(s) 101. These instructions that form the thermal policy manager module(s) may be executed by the CPU 110, the analog signal processor 126, or another processor, in addition to the ADC controller 103 to perform the methods described herein. Further, the processors 110, 126, the memory 112, the instructions stored therein, or a combination thereof may serve as a means for performing one or more of the method steps described herein.

FIG. 7A is a functional block diagram illustrating an exemplary spatial arrangement of hardware for the chip 102 illustrated in FIG. 6. According to this exemplary embodiment, the applications CPU 110 is positioned on the far left side region of the chip 102 while the modem CPU 168, 126 is positioned on a far right side region of the chip 102. The applications CPU 110 may comprise a multi-core processor that includes a zeroth core 222, a first core 224, and an Nth core 230. The applications CPU 110 may be executing a thermal policy manager module 101A (when embodied in software) or it may include a thermal policy manager module 101A (when embodied in hardware). The application CPU 110 is further illustrated to include operating system ("O/S") module 207 and a monitor module 114. Further details about the monitor module 114 will be described below in connection with FIG. 7B.

The applications CPU 110 may be coupled to one or more phase locked loops ("PLLs") 209A, 209B, which are positioned adjacent to the applications CPU 110 and in the left side region of the chip 102. Adjacent to the PLLs 209A, 209B and below the applications CPU 110 may comprise an analog-to-digital ("ADC") controller 103 that may include its own thermal policy manager 101B that works in conjunction with the main thermal policy manager module 101A of the applications CPU 110.

The thermal policy manager 101B of the ADC controller 103 may be responsible for monitoring and tracking multiple thermal sensors 157 that may be provided "on-chip" 102 and "off-chip" 102. The on-chip or internal thermal sensors 157A may be positioned at various locations.

For example, a first internal thermal sensor 157A1 may be positioned in a top center region of the chip 102 between the applications CPU 110 and the modem CPU 168,126 and adjacent to internal memory 112. A second internal thermal sensor 157A2 may be positioned below the modem CPU 168, 126 on a right side region of the chip 102. This second internal thermal sensor 157A2 may also be positioned between an advanced reduced instruction set computer ("RISC") instruction set machine ("ARM") 177 and a first graphics processor 135A. A digital-to-analog controller ("DAC") 173 may be positioned between the second internal thermal sensor 157A2 and the modem CPU 168, 126.

A third internal thermal sensor 157A3 may be positioned between a second graphics processor 135B and a third graphics processor 135C in a far right region of the chip 102. A fourth internal thermal sensor 157A4 may be positioned in a far right region of the chip 102 and beneath a fourth graphics processor 135D. And a fifth internal thermal sensor 157A5 may be positioned in a far left region of the chip 102 and adjacent to the PLLs 209 and ADC controller 103.

One or more external thermal sensors 157B may also be coupled to the ADC controller 103. The first external thermal sensor 157B1 may be positioned off-chip and adjacent to a top right quadrant of the chip 102 that may include the modem CPU 168, 126, the ARM 177, and DAC 173. A second external thermal sensor 157B2 may be positioned off-chip and adjacent to a lower right quadrant of the chip 102 that may include the third and fourth graphics processors 135C, 135D.

One of ordinary skill in the art will recognize that various other spatial arrangements of the hardware illustrated in FIG. 7A may be provided without departing from the scope of the invention. FIG. 7A illustrates yet one exemplary spatial arrangement and how the main thermal policy manager module 101A and ADC controller 103 with its thermal policy manager 101B may manage thermal states that are a function of the exemplary spatial arrangement illustrated in FIG. 7A.

Figure 7B:
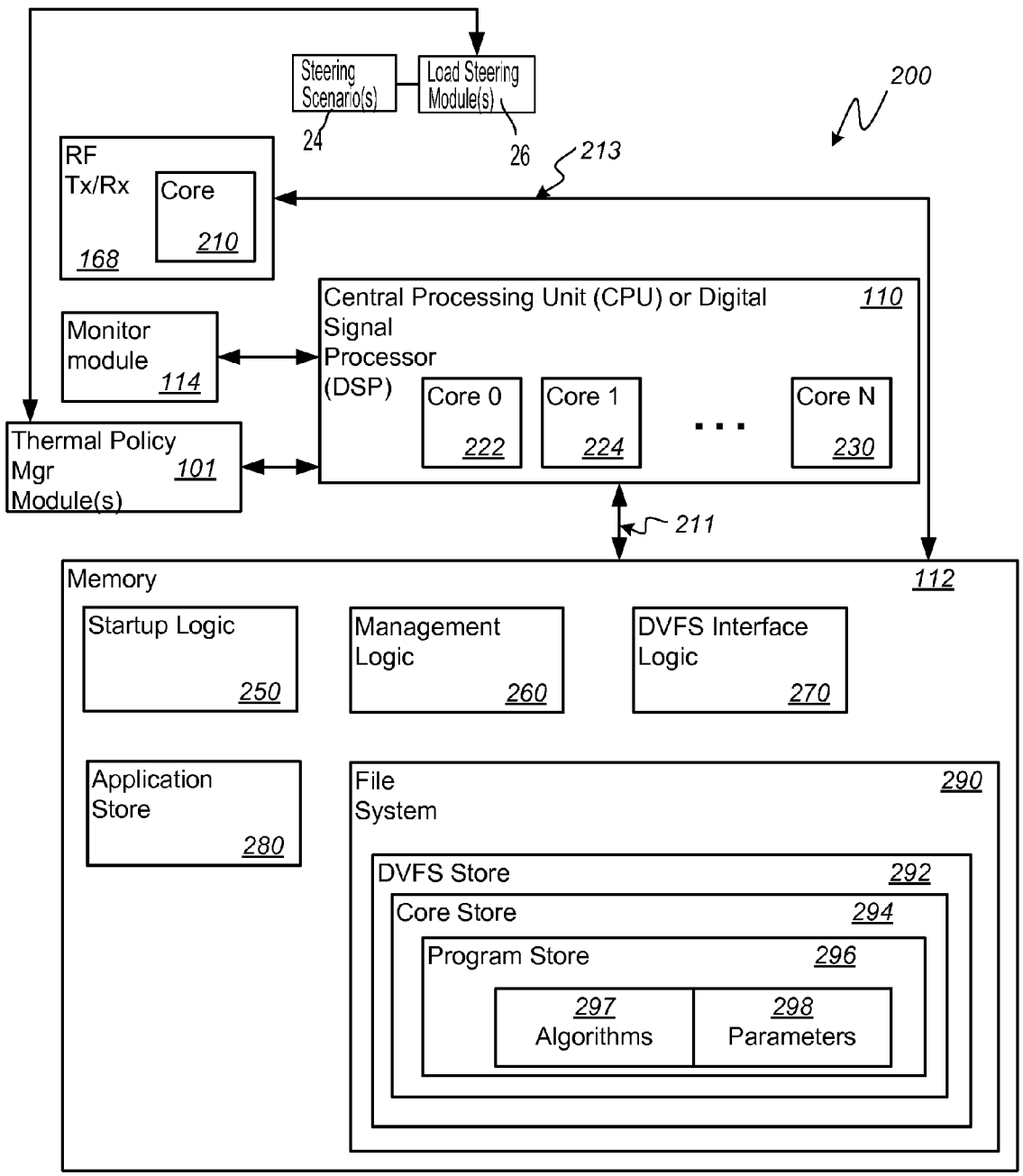
FIG. 7B is a schematic diagram illustrating an exemplary software architecture of the PCD of FIG. 6 for supporting dynamic voltage and frequency scaling ("DVFS") algorithms.

FIG. 7B is a schematic diagram illustrating an exemplary software architecture of the PCD 100 of FIG. 6 and FIG. 7A for supporting dynamic voltage and frequency scaling ("DVFS") algorithms. DVFS algorithms may form or be part of at least one thermal mitigation technique that may be triggered by the thermal policy manager 101 when certain thermal conditions are met as will be described in detail below.

As illustrated in FIG. 7B, the CPU or digital signal processor 110 is coupled to the memory 112 via a bus 211. The CPU 110, as noted above, is a multiple-core processor having N core processors. That is, the CPU 110 includes a first core 222, a second core 224, and an $N^{th}$ core 230. As is known to one of ordinary skill in the art, each of the first core 222, the second core 224 and the $N^{th}$ core 230 are available for supporting a dedicated application or program. Alternatively, one or more applications or programs can be distributed for processing across two or more of the available cores.

The CPU 110 may receive commands from the thermal policy manager module(s) 101 that may comprise software and/or hardware. If embodied as software, the thermal policy manager module 101 comprises instructions that are executed by the CPU 110 that issues commands to other application programs being executed by the CPU 110 and other processors.

The first core 222, the second core 224 through to the Nth core 230 of the CPU 110 may be integrated on a single integrated circuit die, or they may be integrated or coupled on separate dies in a multiple-circuit package. Designers may couple the first core 222, the second core 224 through to the $N^{th}$ core 230 via one or more shared caches and they may implement message or instruction passing via network topologies such as bus, ring, mesh and crossbar topologies.

In the illustrated embodiment, the RF transceiver 168 is implemented via digital circuit elements and includes at least one processor such as the core processor 210 (labeled "Core"). In this digital implementation, the RF transceiver 168 is coupled to the memory 112 via bus 213.

Each of the bus 211 and the bus 213 may include multiple communication paths via one or more wired or wireless connections, as is known in the art. The bus 211 and the bus 213 may have additional elements, which are omitted for simplicity, such as controllers, buffers (caches), drivers, repeaters, and receivers, to enable communications. Further, the bus 211 and the bus 213 may include address, control, and/or data connections to enable appropriate communications among the aforementioned components.

When the logic used by the PCD 100 is implemented in software, as is shown in FIG. 7B, it should be noted that one or more of startup logic 250, management logic 260, dynamic voltage and frequency scaling ("DVFS") interface logic 270, applications in application store 280 and portions of the file system 290 may be stored on any computer-readable medium for use by or in connection with any computer-related system or method.

As understood by one of ordinary skill in the art, the demand for processors that provide high performance and low power consumption has led to the use of dynamic voltage and frequency scaling ("DVFS") in processor designs. DVFS enables trade-offs between power consumption and performance. Processors 110 and 126 (FIG. 6) may be designed to take advantage of DVFS by allowing the clock frequency of each processor to be adjusted with a corresponding adjustment in voltage. Reducing clock frequency alone is not useful, since any power savings is offset by an increase in execution time, resulting in no net reduction in the total energy consumed. However, a reduction in operating voltage results in a proportional savings in power consumed. One main issue for DVFS enabled processors 110, 126 is how to control the balance between performance and power savings.

In the context of this document, a computer-readable medium is an electronic, magnetic, optical, or other physical device or means that can contain or store a computer program and data for use by or in connection with a computer-related system or method. The various logic elements and data stores may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance via optical scanning of the paper or other medium, then compiled, interpreted or otherwise processed in a suitable manner if necessary, and then stored in a computer memory.

In an alternative embodiment, where one or more of the startup logic 250, management logic 260 and perhaps the DVFS interface logic 270 are implemented in hardware, the various logic may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The memory 112 is a non-volatile data storage device such as a flash memory or a solid-state memory device. Although depicted as a single device, the memory 112 may be a distributed memory device with separate data stores coupled to the digital signal processor and or the core 210 (or additional processor cores) in the RF transceiver 168.

The startup logic 250 includes one or more executable instructions for selectively identifying, loading, and executing a select program for managing or controlling the performance of one or more of the available cores such as the first core 222, the second core 224 through to the $N^{th}$ core 230. A select program can be found in the program store 296 of the embedded file system 290 and is defined by a specific combination of a performance scaling algorithm 297 and a set of parameters 298. The select program, when executed by one or more of the core processors in the CPU 110 and the core 210 in the RF transceiver 168, may operate in accordance with one or more signals provided by the monitor module 114 in combination with control signals provided by the one or more thermal policy manager module(s) 101 to scale the performance of the respective processor core. In this regard, the monitor module 114 may provide one or more indicators of events, processes, applications, resource status conditions, elapsed time, as well as temperature as received from the thermal policy manager module 101.

The management logic 260 includes one or more executable instructions for terminating an operative performance scaling program on one or more of the respective processor cores, as well as selectively identifying, loading, and executing a more suitable replacement program for managing or controlling the performance of one or more of the available cores. The management logic 260 is arranged to perform these functions at run time or while the PCD 100 is powered and in use by an operator of the device. A replacement program can be found in the program store 296 of the embedded file system 290 and is defined by a specific combination of a performance scaling algorithm 297 and a set of parameters 298.

The replacement program, when executed by one or more of the core processors in the digital signal processor or the core 210 in the RF transceiver 168, may operate in accordance with one or more signals provided by the monitor module 114 or one or more signals provided on the respective control inputs of the various processor cores to scale the performance of the respective processor core. In this regard, the monitor module 114 may provide one or more indicators of events, processes, applications, resource status conditions, elapsed time, temperature, etc in response to control signals originating from the thermal policy manager 101.

The DVFS interface logic or interface logic 270 includes one or more executable instructions for presenting, managing and interacting with external inputs to observe, configure, or otherwise update information stored in the embedded file system 290. In one embodiment, the interface logic 270 may operate in conjunction with manufacturer inputs received via the USB port 142. These inputs may include one or more programs to be deleted from or added to the program store 296. Alternatively, the inputs may include edits or changes to one or more of the programs in the program store 296. Moreover, the inputs may identify one or more changes to, or entire replacements of one or both of the startup logic 250 and the management logic 260. By way of example, the inputs may include a change to the management logic 260 that instructs the PCD 100 to suspend all performance scaling in the RF transceiver 168 when the received signal power falls below an identified threshold. By way of further example, the inputs may include a change to the management logic 260 that instructs the PCD 100 to apply a desired program when the video codec 134 is active.

The interface logic 270 enables a manufacturer to controllably configure and adjust an end user's experience under defined operating conditions on the PCD 100. When the memory 112 is a flash memory, one or more of the startup logic 250, the management logic 260, the interface logic 270, the application programs in the application store 280 or information in the embedded file system 290 can be edited, replaced, or otherwise modified. In some embodiments, the interface logic 270 may permit an end user or operator of the PCD 100 to search, locate, modify or replace the startup logic 250, the management logic 260, applications in the application store 280 and information in the embedded file system 290. The operator may use the resulting interface to make changes that will be implemented upon the next startup of the PCD 100. Alternatively, the operator may use the resulting interface to make changes that are implemented during run time.

The embedded file system 290 includes a hierarchically arranged DVFS store 292. In this regard, the file system 290 may include a reserved section of its total file system capacity for the storage of information for the configuration and management of the various parameters 298 and performance scaling algorithms 297 used by the PCD 100. As shown in FIG. 7B, the DVFS store 292 includes a core store 294, which includes a program store 296, which includes one or more DVFS programs. Each program is defined as a combination of a respective performance scaling algorithm and a set of parameters associated with the specific algorithm. As a further example of the hierarchical nature of the DVFS store 292, a particular member of a set of files may be located and identified by the path of \startup\core0\algorithm\parameter set. In this example, a program is identified by the algorithm in combination with the contents of information stored in the parameter set. For example, a conventional DVFS algorithm known as "classic" may be identified to manage performance scaling on core0 222 in accordance with the parameters sample rate, samples to increase, and samples to decrease as follows: \startup\core0\classic\SampleRate, with a value of 100, where the sample rate is in MHz; \startup\core0\classic\SamplesToIncrease, with a value of 2, where the samples to increase is an integer; and \startup\core0\classic\SamplesToDecrease, with a value of 1, where the samples to decrease is an integer.

That is, the respective filenames define a parameter and the value of the parameter is identified by the contents of the file. The algorithm is defined by a periodic sampling of the CPU idle percentage and operates in accordance with a low threshold (% idle) and a high threshold (% idle). If a samples-to-increase threshold comparator indicates for two consecutive samples that performance should be increased, the DVFS algorithm increases performance in accordance with a predetermined clock level adjustment. Conversely, if a samples-to-decrease threshold comparator indicates for 1 consecutive sample that performance should be decreased, the DVFS algorithm decreases performance in accordance with the predetermined clock level (i.e., frequency) adjustment. As explained above, processor or core operating voltage may be changed together with changes in the clock frequency.

Alternatively, or additionally, the DVFS store 292 may be arranged such that the search path starts from the most specific with respect to its application (i.e., the processor core, algorithm, and parameter value) progresses to the least specific with respect to application. In an example embodiment, parameters are defined in the directories /core0, /coreAll and /default in association with the "classic" performance scaling algorithm. For example, the path \core0\classic\SampleRate—applies only to the classic algorithm operating on core0. This most specific application will override all others. The path \coreAll\classic\SampleRate— applies to any processor core running the classic algorithm. This application is not as specific as the example path above but is more specific than \default\classic\SampleRate— which applies to any processor core running the classic algorithm.

This default application is the least specific and is used only if no other suitable path exists in the DVFS store 292. The first parameter found will be the one used. The \default location will always have a valid parameter file. The architecture of the individual cores, the architecture of the one or more shared caches and the mechanism(s) used to pass instructions between the cores, as well as the desired use cases for the PCD 100 are expected to dictate the nature of the various performance scaling algorithms 297 stored in the memory 112.

Figure 7C:
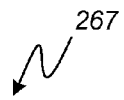
FIG. 7C is a first table listing exemplary frequency values for two DVFS algorithms.

FIG. 7C is a first table 267 listing exemplary frequency values for two different DVFS algorithms that may be selected by the DVFS interface logic 270. According to this exemplary first table 267, each core of the multi-core CPU 110 may be assigned specific maximum clock frequency values depending upon the current DVFS algorithm being executed. For the first DVFS algorithm that is listed in the first row of the table 627, Core 0 may be assigned a maximum clock frequency of 600 MHz, while Core 1 may be assigned a maximum clock frequency of 650 MHz, and the Nth Core may be assigned a maximum clock frequency of 720 MHz. For the second DVFS algorithm that is listed in the second row of the table 627, Core 0 may be assigned a maximum clock frequency of 610 MHz, while Core 1 is assigned a maximum clock frequency of 660 MHz, and the Nth core may be assigned a maximum clock frequency of 700 MHz. These limits on clock frequency may be selected by the thermal policy manager 101 depending upon the current thermal state of the PCD 100.

Figure 7D:
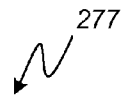
FIG. 7D is a second table listing exemplary frequency and voltage pairs for two DVFS algorithms.

FIG. 7D is a second table 277 listing exemplary frequency and voltage pairs for two DVFS algorithms. For a first DVFS algorithm listed in the first row of the table 277, Core 0 may be assigned a maximum clock frequency of 600 MHz while its maximum voltage may be limited to 1.3 mV. Core 1 may be assigned a maximum clock frequency of 500 MHz and a corresponding maximum voltage of 2.0 mV. Core N may be assigned a maximum clock frequency of 550 MHz and a corresponding maximum voltage of 1.8 mV. For the second DVFS algorithm listed in the second row of the table 277, Core 0 may be assigned a maximum clock frequency of 550 MHz while the maximum voltage is assigned the value of 1.0 mV. Core 1 may be assigned a maximum clock frequency of 600 MHz and the corresponding maximum voltage of 1.5 mV. And lastly, Core N may be assigned a maximum clock frequency of 550 MHz and a corresponding maximum voltage of 1.9 mV. The thermal policy manager 101 may select the various pairs of frequency and voltages enumerated in table 277 depending upon the current thermal state of the PCD 100.

Figure 8:
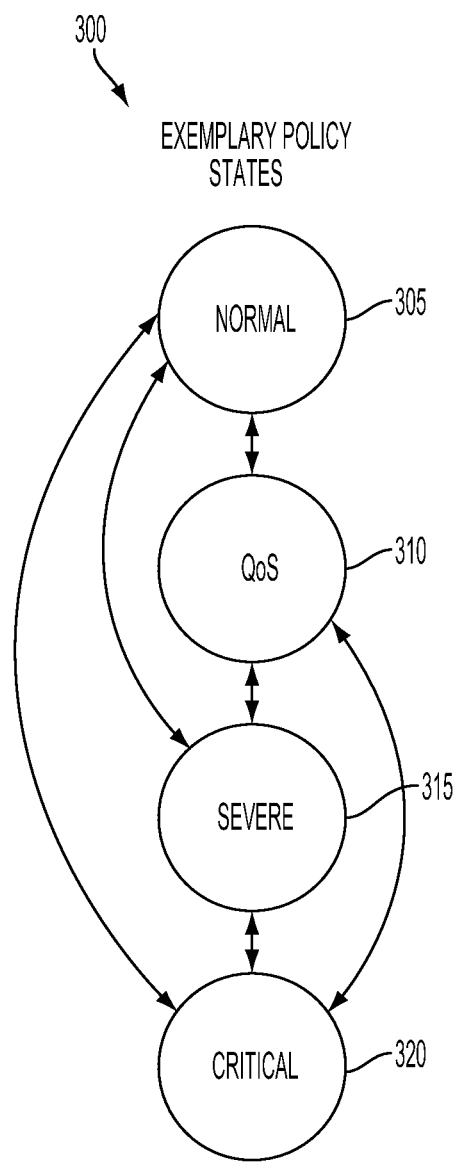
FIG. 8 is an exemplary state diagram that illustrates various thermal policy states that may be managed by the thermal policy manager in the PCD of FIG. 1.

FIG. 8 is an exemplary state diagram 300 that illustrates various thermal policy states 305, 310, 315, and 320 that are tracked by the thermal policy manager 101. The first policy state 305 may comprise a "normal" state in which the thermal policy manager 101 only monitors thermal sensors 157 in a routine or ordinary fashion. In this exemplary first and normal state 305, the PCD 100 is usually not in any danger or risk of reaching critical temperatures that may cause failure of any of the hardware and/or software components. In this exemplary state, the thermal sensors 157 may be detecting or tracking temperatures that are at 50° C. or below. However, one of ordinary skill in the art will recognize that other temperature ranges may be established for the first and normal state 305 without departing from the scope of the invention.

The second policy state 310 may comprise a "quality of service" or "QoS" state in which the thermal policy manager 101 may increase the frequency in which thermal sensors 157 are polled or in which the thermal sensors 157 send their temperature status reports to the thermal policy manager 101. This exemplary second state 310 may be reached or entered into by the thermal policy manager 101 when a change of temperature has been detected in the first, normal state 305. The threshold or magnitude of the change in temperature (delta T) which triggers this QoS state 310 may be adjusted or tailored according to a particular PCD 100. Therefore, while a PCD 100 may be operating in the first normal state 305, depending upon the magnitude of the change in temperature that is detected by one or more thermal sensors, the PCD 100 may leave the first normal state 305 and enter into the second QoS state 310 as tracked by the thermal policy manager 101.

For example, a PCD 100 may have a first maximum temperature reading from a given thermal sensor 157 of approximately 40° C. And a second reading from the same thermal sensor 157 may show a change in temperature of only 5° C.

which takes the maximum temperature being detected to 45° C. However, while the maximum temperature being detected may be below an established threshold of 50° C. for the first, normal state 305, the change in temperature by 5° C. may be significant enough for the thermal policy manager 101 to change the state to the second, QoS state 310.

In the second, QoS thermal state 310 the thermal policy manager 101 may request or it may actually perform one or more thermal mitigation techniques in order to reduce the thermal load and temperature of the PCD 100. In this particular state 310, the thermal policy manager 101 is designed to implement or request thermal mitigation techniques that may be barely perceivable by an operator and which may degrade a quality of service provided by the PCD 100 in a minimal fashion. The temperature range for this second, QoS thermal state 310 may comprise a range between about 50° C. to about 80° C. One of ordinary skill in the art will recognize that other temperature ranges may be established for the second, QoS state 310 and are within the scope of the invention.

As noted previously, the second, QoS state 310 may be triggered based on the magnitude and/or location of the change in temperature and are not necessarily limited to the endpoints of a selected temperature range. Further details about this second, QoS thermal state 310 will be described below in connection with FIG. 9.

The third thermal state 315 may comprise a "severe" state in which the thermal policy manager 101 continues to monitor and/or receives interrupts from thermal sensors 157 while requesting and/or applying more aggressive thermal mitigation techniques relative to the second, QoS state 310 described above. This means that in this state the thermal policy manager 101 is less concerned about quality of service from the perspective of the operator. In this thermal state, the thermal policy manager 101 is more concerned about mitigating or reducing thermal load in order to decrease temperature of the PCD 100. In this third thermal state 315, a PCD 100 may have degradations in performance that are readily perceived or observed by an operator. The third, severe thermal state 315 and its corresponding thermal mitigation techniques applied or triggered by the thermal policy manager 101 will be described in further detail below in connection with FIG. 9. The temperature range for this third, severe thermal state 310 may comprise a range between about 80° C. to about 100° C.

Similar to the first thermal state 305 and second thermal state 310 as discussed above, this third and severe thermal state 315 may be initiated based upon the change in temperature detected by one or more thermal sensors 157 and not necessarily limited to a temperature range established or mapped for this third thermal state 315. For example, as the arrows in this diagram illustrate, each thermal state may be initiated in sequence or they can be initiated out of sequence depending upon the magnitude of the change in temperature (delta T) that may be detected. So this means that the PCD 100 may leave the first and normal thermal state 305 and enter into or initiate the third and severe thermal state 315 based on a change in temperature that is detected by one or more thermal sensors 157, and vice versa. Similarly, the PCD 100 may be in the second or QoS thermal state 310 and enter into or initiate the fourth or critical state 320 based on a change in temperature that is detected by one or more thermal sensors 157, and vice versa. In this exemplary fourth and critical state 320, the thermal policy manager 101 is applying or triggering as many and as sizable thermal mitigation techniques as possible in order to avoid reaching one or more critical temperatures that may cause permanent damage to the electronics contained within the PCD 100.

This fourth and critical thermal state 320 may be similar to conventional techniques that are designed to eliminate functionality and operation of a PCD 100 in order to avoid critical temperatures. The fourth thermal state 320 may comprise a "critical" state in which the thermal policy manager 101 applies or triggers the shutting down of non-essential hardware and/or software. The temperature range for this fourth thermal state may include those of about 100° C. and above. The fourth and critical thermal state 320 will be described in further detail below in connection with FIG. 9.

The thermal policy management system is not limited to the four thermal states 305, 310, 315, and 320 illustrated in FIG. 8. Depending upon a particular PCD 100, additional or fewer thermal states may be provided without departing from the scope of the invention. That is, one of ordinary skill in the art recognizes that additional thermal states may improve functionality and operation of a particular PCD 100 while in other situations fewer thermal states may be preferred for a particular PCD 100 that has its own unique hardware and/or software.

FIG. 9 is a diagram illustrating exemplary thermal mitigation techniques that may be applied or ordered by the thermal policy manager 101 and are dependent upon a particular thermal state of a PCD 100. It should be appreciated that the thermal mitigation techniques described herein may be applied to manage thermal loads associated with any type of processing, but may be particularly useful in situations involving graphics processing due to inherent power demands, system requirements, and importance to the overall user experience of the PCD 100. As noted previously, the first thermal state 305 may comprise a "normal" state in which the thermal policy manager 101 being executed by the CPU 110 and partially by the ADC controller 103 may monitor, poll, or receive one or more status reports on temperature from one or more thermal sensors 157. In this first thermal state 305, a PCD 100 may not be in any danger or risk of reaching a critical temperature that may harm one or more software and/or hardware components within the PCD 100. Usually, in this first thermal state, the thermal policy manager 101 is not applying or has not requested any initiation of thermal mitigation techniques such that the PCD 100 is operating at its fullest potential and highest performance without regard to thermal loading. The temperature range for this first thermal state 305 may include those of 50° C. and below. For this first thermal state 305, the thermal policy manager 101 may reside in the ADC controller 103 while the main thermal policy manager 101 for all other states may reside or be executed by the CPU 110. In an alternate exemplary embodiment, the thermal policy manager 101 may reside only in the CPU 110.

In the second thermal state 310 also referred to as the QoS state 310, once it is initiated, the thermal policy manager 101 may begin more rapid monitoring, polling, and/or receiving of interrupts (relative to the first thermal state 305) from thermal sensors 157 regarding current temperature of the PCD 100. In this exemplary second thermal state 310, the thermal policy manager 101 may initiate or request the monitor module 114 and/or operating system ("O/S") module 207 of FIG. 7A to start applying thermal mitigation techniques but with the objective to maintain high-performance with little or no perception in degradations to the quality of service as perceived by the operator of the PCD 100.

According to this exemplary second thermal state 310 illustrated in FIG. 9, the thermal policy manager 101 may request the monitor 114 and/or the O/S module 207 to initiate thermal mitigation techniques such as, but not limited to, (1) load scaling and/or (2) load dynamic scaling; (3) spatial load shifting; and (4) process load reallocation. Load scaling may comprise adjusting or "scaling" the maximum clock frequency allowed in DVFS algorithm, such as the values provided in the first table 267 of FIG. 7C. Such an adjustment may limit the maximum heat dissipation. This thermal load mitigation technique may also involve adjusting the voltage to match the standard DVFS table used for a particular and unique PCD 100.

The thermal load mitigation technique of load dynamic scaling may comprise the scaling of one and/or all/of the N application processor cores 222, 224, and 230. This thermal load mitigation technique may comprise establishing the max clock frequency allowed for the DVFS algorithm of a particular core 222, 224, or 230. The DVFS algorithm will use a table of voltage/frequency pairs, such as the second table 277 illustrated in FIG. 7D, to scale processing capability.

One such way includes limiting the number of millions of instructions per second ("MIPS") by limiting the max frequency allowed. In this way, the thermal policy manager 101 is effectively limiting the power consumption of the core(s) 222, 224, and 230 and limiting their capability (MIPS) that is available. The thermal policy manager 101 may choose to limit N cores 222, 224, 230 together, or it can select and choose which cores 222, 224, 230 get scaled back while allowing other cores 222, 224, 230 to operate in an unconstrained manner. The thermal policy manager 101, monitor module 114, and/or O/S module 207 may make their decisions on which cores 222, 224, 230 to control based on data received from thermal sensors 157 or software application requirements based, and/or best effort prediction. The temperature range for this second thermal state may include those of about 50° C. to about 80° C.

The thermal load mitigation technique of spatial load shifting comprises the activation and deactivation of cores within a multi-core processor system. If N multiple cores exist, each core may be loaded up with work or its performance maximized using up to N-1 cores and then as a thermal sensor 157 indicates a heating problem, the location of an inactive core functioning as a cooling device may be shifted. Each core may effectively be cooled by letting it idle in a predetermined pattern or in a pattern dictated by thermal measurements. A 'hole' is effectively moved in MIPS around the cores to cool them are in the course of several seconds. In this way, several GHz of processing power may be made available to a PCD 100, while still cooling the silicon die by moving the load around. Further details of spatial load shifting will be described below in connection with FIGS. 13A.

The thermal mitigation technique of process load reallocation is described below in connection with FIGS. 12-14. In general, however, this technique is directed to the management of thermal energy creation and dissipation resulting from the operation of multi-core graphics processing units ("GPU") and/or multi-core central processing units ("CPU"). Ideally, for the efficient implementation of a thermal mitigation technique in the form of a process load reallocation algorithm, PCD 100 may have temperature sensors 157 in close proximity to individual cores or groups of cores. Based on temperature readings from sensors 157, drivers executed on one or more of the cores themselves may be leveraged to cause a process load reallocation from a "hot" core to a "cool," or otherwise less utilized, core. Advantageously, embodiments of various thermal mitigation techniques, such as process load reallocation and spatial load shifting may be implemented in real-time, or near real-time, as the thermal policy manager module(s) 101 may be operable to react to temperature readings which fluctuate with processing loads. Thus, in embodiments operable to take thermal mitigation measures in real-time, or near real-time, based on active monitoring of temperature readings from sensors 157, one of ordinary skill in the art will recognize that predefined thermal steering scenarios 24 may not be required. That is, some embodiments may utilize algorithms that, based on real-time temperature inputs and workload data, can generate instructions for efficient reallocation or spatial shifting of processing load.

Notably, in some embodiments, such as embodiments designed for process load reallocation in multi-core CPUs having cores which contain both main processing blocks with low power density and specialized, sub-processor blocks with high power density ratings, process loads may be reallocated within a given core. For example, process loads requiring high computational power such as, but not limited to, gaming applications having excessive graphical processing requirements, may normally be scheduled for processing at a sub-core level to benefit from the improved computational capacity of the sub-core. An overloaded process queue at a sub-core, however, may generate excessive thermal energy that could be detrimental to the CPU 110 or other components comprised within the PCD 100. In such a scenario, the thermal energy load may be mitigated by reallocating within the given core (as opposed to between cores) all or part of the process load from the high density sub-processor block to the lower power density main process block.

Referring now to the third thermal state 315 of FIG. 9, also known as the severe thermal state 315, the thermal policy manager 101 may start continuous monitoring, polling, or receiving interrupts from thermal sensors 157 so that temperature is sensed more continuously/frequently compared to the second lower thermal state 310. In this exemplary thermal state 315, the thermal policy manager 101 may apply or request that the monitor module 114 and/or O/S module 207 apply more aggressive thermal mitigation techniques and/or additional thermal mitigation techniques (relative to the second thermal state 310) with probable perceivable degradation of performance observed by an operator of the PCD 100. According to this exemplary thermal state 315, the thermal policy manager 101 may cause reduction in power to one or more hardware devices like amplifiers, processors, etc. The thermal policy manager 101 may also shift workloads among different hardware devices in a spatial manner in order to bring active devices off-line and to bring inactive devices on-line. The thermal mitigation techniques of this third and severe thermal state 315 may be the same as those described above with respect to the second, quality of service thermal state 310. However, these same thermal mitigation techniques may be applied in a more aggressive manner. For example, in reallocation of process loads, the thermal policy manager 101 may request that a larger percentage of process loads are reallocated from the high power density sub-processor blocks to the main processor blocks of the various cores, as compared to the second thermal state 310. Further, the thermal policy manager 101 may request that active process loads are completely reallocated from the high power density sub-processor blocks to the main processor blocks of the various cores, effectively taking the high thermal energy generating sub-processor blocks offline. These process load allocations may result in less than desirable processing performance that what is recommended for supporting a particular application program.

Referring now to the fourth and critical state 320 of FIG. 9, the thermal policy manager 101 may start shutting down or requesting the monitor 114 and/or O/S module 207 to start shutting down all nonessential hardware and/or software modules.

"Nonessential" hardware and/or software modules may be different for each type of particular PCD 100. According to one exemplary embodiment, all nonessential hardware and/or software modules may include all of those outside of an emergency 911 telephone call function and global positioning satellite ("GPS") functions. This means that the thermal policy manager 101 in this fourth, critical thermal state 320 may cause the shutdown of hardware and/or software modules that are outside of emergency 911 telephone calls and GPS functions. The thermal policy manager 101 may shut down modules in sequence and/or in parallel depending upon the critical temperatures being monitored by the thermal sensors 157 and the change in temperature being observed by the thermal policy manager 101. The temperature range for this fourth thermal state 320 may include those of about 100° C. and above.

Figure 10:
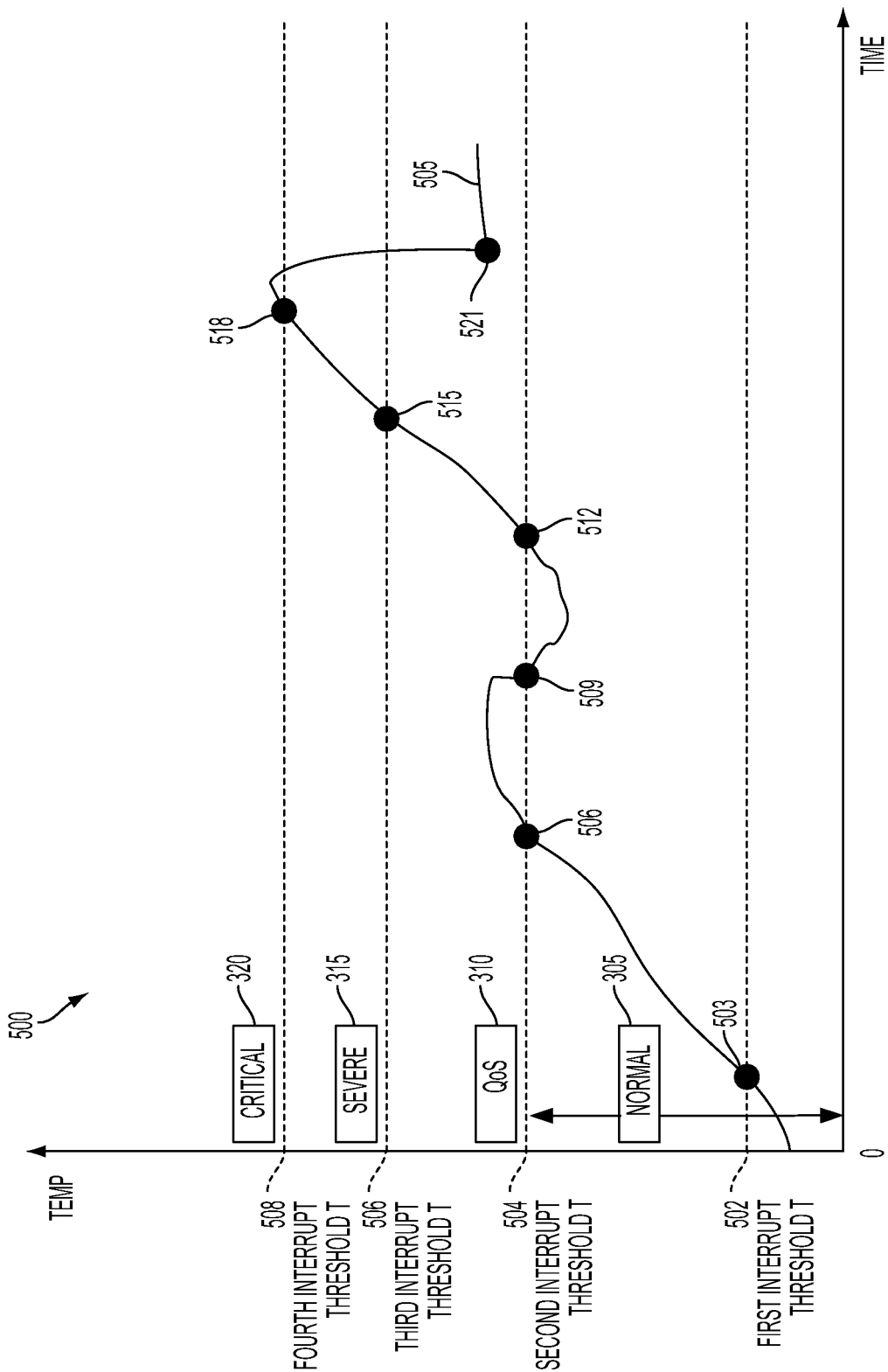
FIG. 10 is a diagram illustrating an exemplary graph of temperature versus time and corresponding thermal policy states.

FIG. 10 is a diagram illustrating an exemplary graph 500 of temperature versus time and corresponding thermal policy states 305, 310, 315, and 320. At the first point 503 of the temperature plot or line 505, the thermal policy manager 101 may receive a first interrupt temperature reading of 40° C. from one or more thermal sensors 157. Because this first temperature reading of 40° C. may be below the maximum temperature of 50° C. set for the normal thermal state 305, the thermal policy manager 101 may remain in the first or normal thermal state 305.

At a second point 506 along the temperature line 505, the thermal policy manager 101 may receive a second interrupt temperature reading of 50° C. Though 50° C. may be within the selected temperature range for the first thermal state 305, if the change in temperature from the last temperature reading was significant, such as a large temperature change within a short period of time (like a 3° C. change within five seconds), then such a change or jump in temperature may trigger the thermal policy manager 101 to leave the normal thermal state 305 and initiate the second, QoS thermal state 310.

Between the second point 506 and third point 509 of the temperature line 505, the temperature of the PCD 100 was above 50° C. and the thermal policy manager 101 may have requested or activated one or more thermal mitigation techniques in order to lower the temperature of the PCD 100. At the third point 509 of the temperature line 505, the thermal policy manager 101 may change the thermal state of the PCD 100 from the second state 310 to the first and normal state 305.

At the fourth point 512, the thermal policy manager 101 may observe that the temperature trend is moving in an upward fashion or, in other words, the temperature line 505 may have a positive slope or change in delta T. The thermal policy manager 101 may change the thermal state of the PCD 100 in view of this data from the first thermal state 305 to the second, QoS thermal state 310. In the second thermal state 310, the thermal policy manager 101 may request or it may activate one or more thermal mitigation techniques that should not significantly impact the quality of service provided by the PCD 100. The second thermal state 310 may include a temperature range of about 50° C. to about 80° C.

Moving along the temperature line 505 to the fifth point 515 which has a magnitude of about 80° C., the thermal policy manager 101 may initiate a change of thermal state from the second, QoS thermal state 310 to the third and severe thermal state 315. As noted previously, the temperature range for this first thermal state may include a range of about 80° C. to about 100° C. In this third and severe thermal state 310, the thermal policy manager 101 may be requesting or activating a plurality of thermal mitigation techniques that may impact the quality of service and performance of the PCD 100.

The segment of the temperature line 505 between the fifth point 515 and sixth point 518 reflects that the third and severe thermal state 310 has been unsuccessful in mitigating the temperature rise within the PCD 100. Therefore, at the sixth point 518 which may have a magnitude of approximately 100° C., the thermal policy manager 101 may enter into the fourth and critical state 320. In this fourth and critical state 320, the thermal policy manager 101 may activate or request that certain hardware and/or software components be shut down in order to alleviate the current thermal load. As noted previously, the thermal policy manager 101 may cause any hardware and/or software component outside of emergency 911 call functions and GPS functions to be shut down while in this fourth thermal state 320.

Moving along the temperature line 505 to the seventh point 521, the segment of the line 505 between the sixth point 518 and seventh point 521 reflects that the critical thermal state 320 and severe thermal state 315 were successful in lowering the temperature of the PCD 100. As noted previously, one or more thermal states may be jumped or skipped depending upon the temperature measured by the thermal sensors 157 and observed by the thermal policy manager 101.

Figure 11A:
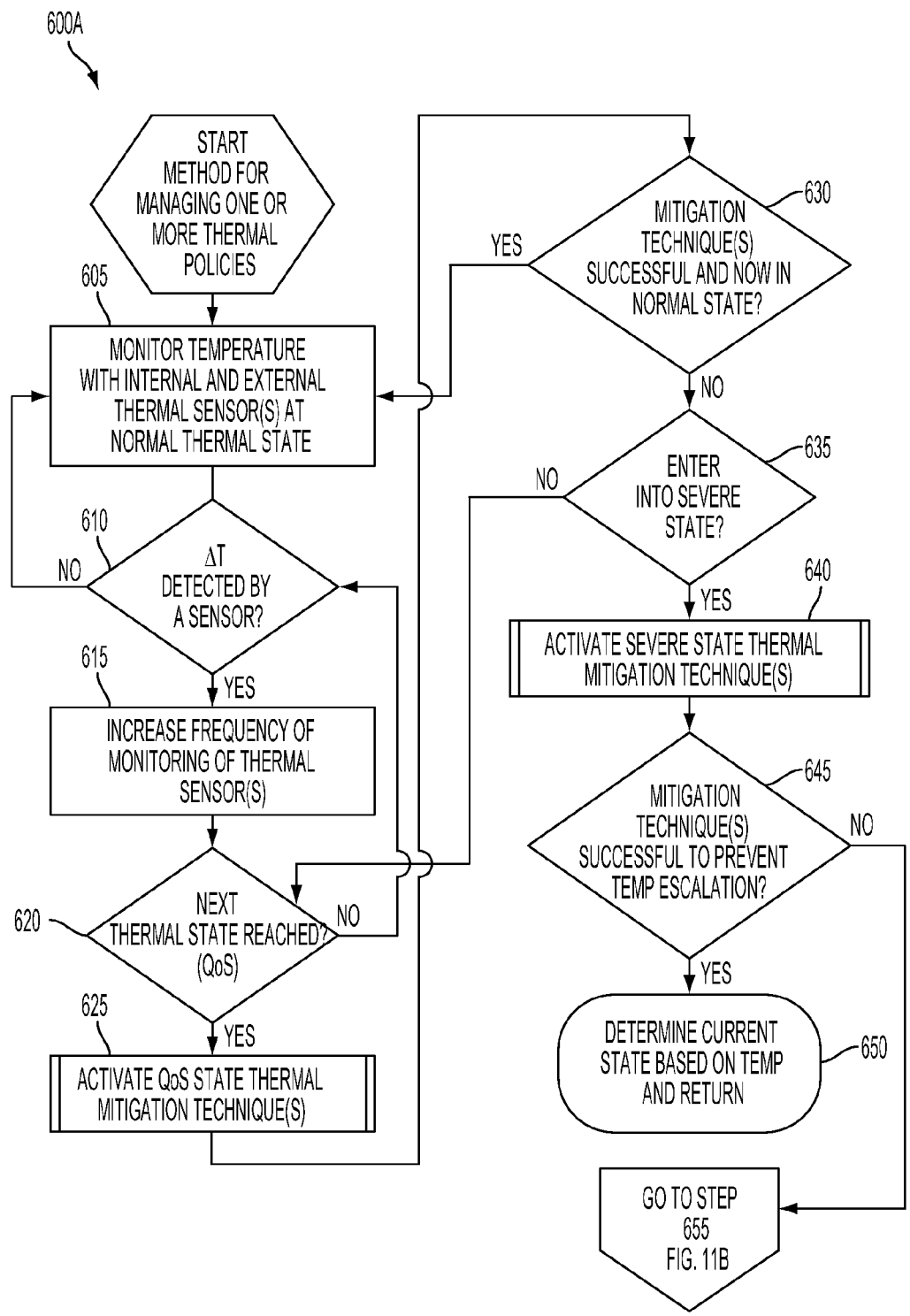
FIGS. 11A & 11B are logical flowcharts illustrating a method for managing one or more thermal policies.
Figure 11B:
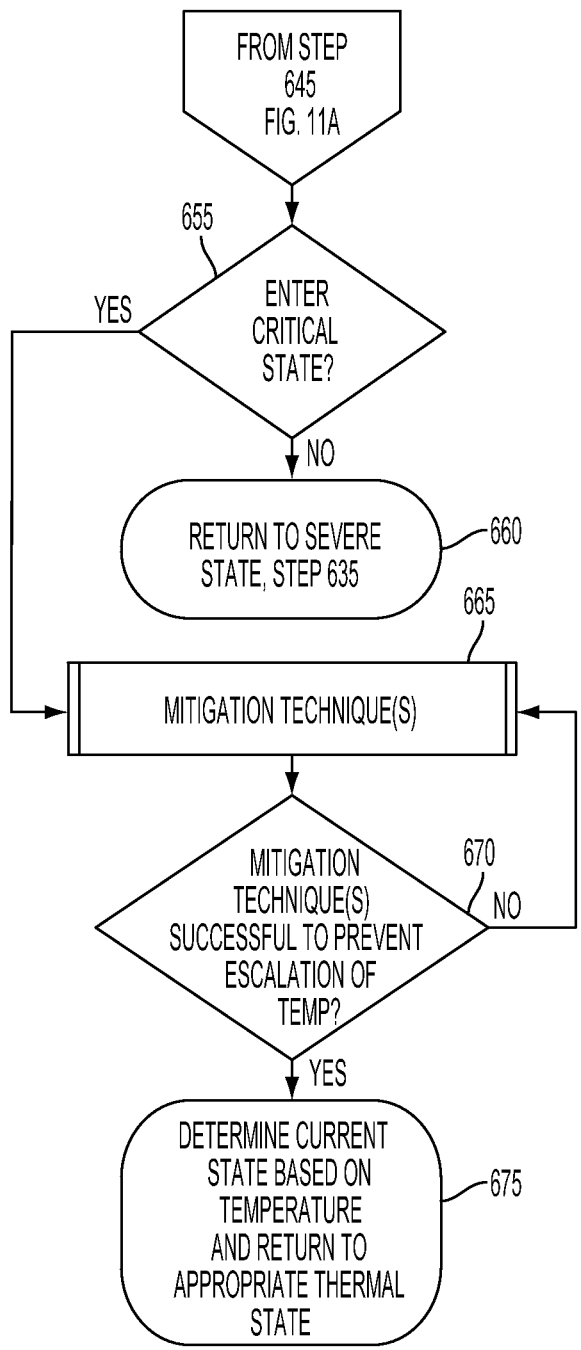

FIGS. 11A & 11B are logical flowcharts illustrating a method 600 for managing one or more thermal policies of a PCD 100. Method 600A of FIG. 11A starts with first block 605 in which the thermal policy manager 101 may monitor temperature with internal and external thermal sensors 157 while in a first thermal state 305. This first block 605 generally corresponds with the first thermal state 305 illustrated in FIGS. 8 & 9. As noted previously, the thermal policy manager 101 may monitor, actively poll, and/or receive interrupts from one or more thermal sensors 157. In this particular thermal state, the thermal policy manager 101 does not apply any thermal mitigation techniques. The PCD 100 may perform at its optimal level without regard to any thermal loading conditions in this first thermal state.

Next, in decision block 610, the thermal policy manager 101 may determine if a temperature change (delta T) has been detected by one or more thermal sensors 157. If the inquiry to decision block 610 is negative, then the "NO" branch is followed back to block 605. If the inquiry to decision block 610 is positive, then the "YES" branch is followed to block 615 in which the thermal policy manager 101 may increase the frequency of the monitoring of the thermal sensors 157. In block 615, the thermal policy manager may actively poll the thermal sensors 157 more frequently or it may request the thermal sensors 157 to send more frequent interrupts that provide temperature data. This increased monitoring of thermal sensors 157 may occur in the first or normal state 305 and it may also occur in the second or quality of service thermal state 310.

Next, in decision block 620, the thermal policy manager 101 may determine if the next thermal state has been reached or achieved by the PCD 100. In this decision block 620, the thermal policy manager 101 may be determining if the temperature range assigned to the second thermal state 310 has been achieved. Alternatively, the thermal policy manager in this decision block 620 may be determining if a significant change in temperature (delta T) has occurred since a last reading.

If the inquiry to decision block 620 is negative, then the "NO" branch is followed back to decision block 610. If the inquiry to decision block 620 is positive, then the "YES" branch is followed to routine or subroutine 625. Routine or subroutine 625 may comprise a second thermal state 310 also referred to as the QoS state 310 in which thermal policy manager 101 may apply or request one or more thermal mitigation techniques described above in connection with FIG. 9. For example, the thermal policy manager 101 may request the monitor 114 and/or the O/S module 207 to initiate thermal mitigation techniques such as, but not limited to, (1) load scaling and/or (2) load dynamic scaling and/or (3) spatial load shifting and/or (4) process load reallocation as described above.

Subsequently, in decision block 630, the thermal policy manager 101 may determine if the one or more thermal mitigation techniques of the second or QoS state 310 were successful and if the current temperature as detected by the one or more thermal sensors 157 falls within the next lower thermal range for the first or normal state 305. If the inquiry to decision block 630 is positive, then the "YES" branch is followed back to block 605. If the inquiry to decision block 630 is negative, then the "NO" branch is followed to decision block 635.

In decision block 635, the thermal policy manager 101 may determine if the PCD 100 has now entered into the third or severe thermal state 315 according to the temperature as detected by the one or more thermal sensors 157. Alternatively, the thermal policy manager 101 may determine if the PCD 100 has entered into the third or severe thermal state 315 by determining if a significant change in temperature (delta T) has occurred.

If the inquiry to decision block 635 is negative, the "NO" branch is followed back to decision block 620. If the inquiry to decision block 635 is positive, then the "YES" branch is followed to submethod or subroutine 640.

In submethod or subroutine 640, the thermal policy manager 101 has determined that the PCD 100 has entered into the third or severe thermal state. The thermal policy manager 101 may then activate or request that one or more thermal mitigation techniques be applied. As noted previously, the thermal policy manager 101 in this third or severe thermal state 315 may start continuous monitoring, polling, or receiving interrupts from thermal sensors 157 so that temperature is sensed more continuously/frequently compared to the second lower thermal state 310.

In this exemplary thermal state 315, the thermal policy manager 101 may apply or request that the monitor module 114 and/or O/S module 207 apply more aggressive thermal mitigation techniques and/or additional thermal mitigation techniques (relative to the second thermal state 310) with probable perceivable degradation of performance observed by an operator of the PCD 100. According to this exemplary thermal state 315, the thermal policy manager 101 may cause reduction in power to one or more hardware devices like amplifiers, processors, etc. The thermal policy manager 101 may also shift workloads among different hardware devices in a spatial manner in order to bring active devices off-line and to bring inactive devices on-line. Further, the thermal policy manager may increase the percentage of process loads reallocated from a high performance sub-processor block to the main processor blocks. The thermal mitigation techniques of this third and severe thermal state 315 may be the same as those described above with respect to the second, quality of service thermal state 310. As explained above, however, these same thermal mitigation techniques may be applied in a more aggressive manner.

Next, in decision block 645, the thermal policy manager 101 may determine that the one or more thermal mitigation techniques applied in subroutine 640 were successful to prevent escalation of temperature for the PCD 100. If the inquiry to decision block 645 is negative, then the "NO" branch is followed to step 655 of FIG. 11B. If the inquiry to decision block 645 is positive, then the "YES" branch is followed to step 650 in which the thermal policy manager 101 determines the current thermal state of the PCD 100 based on temperature readings provided by the one or more thermal sensors 157.

FIG. 11B is a continuation flow chart relative to the flowchart illustrated in FIG. 11A. The method 600B of FIG. 11B starts with decision block 655 in which the thermal policy manager 101 may determine if the PCD 100 has entered into the fourth or critical thermal state 320 based on the temperature being detected by one or more thermal sensors 157. If the inquiry to decision block 655 is negative, then the "NO" branch is followed to step 660 in which the thermal policy manager 101 returns the PCD 100 to the third or severe thermal state 315 and the process returns to block 635 of FIG. 11A.

If the inquiry to decision block 655 is positive, then the "YES" branch is followed to subroutine 665 in which the thermal policy manager 101 activates or requests that one or more critical thermal mitigation techniques be implemented. The thermal policy manager 101 in this fourth, critical thermal state 320 may cause the shutdown of hardware and/or software modules that are outside of emergency 911 telephone calls and GPS functions. The thermal policy manager 101 may shut down modules in sequence and/or in parallel depending upon the critical temperatures being monitored by the thermal sensors 157 and the change in temperature being observed by the thermal policy manager 101.

Subsequently, in decision block 670, the thermal policy manager 101 may determine that the thermal mitigation techniques applied in routine or submethod 665 were successful to prevent any escalation of temperature of the PCD 100 as detected by the thermal sensors 157. If the inquiry to decision block 670 is negative, then the "NO" branch is followed back to routine or submethod 665.

If the inquiry to decision block 670 is positive, then the "YES" branch is followed to step 675 in which the thermal policy manager 101 determines the current thermal state of the PCD 100 based on temperature readings supplied by one or more thermal sensors 157. Once the temperature readings are assessed by the thermal policy manager 101, the thermal policy manager 101 initiates the thermal state corresponding to the temperature ranges detected by the thermal sensors 157.

Figure 12:
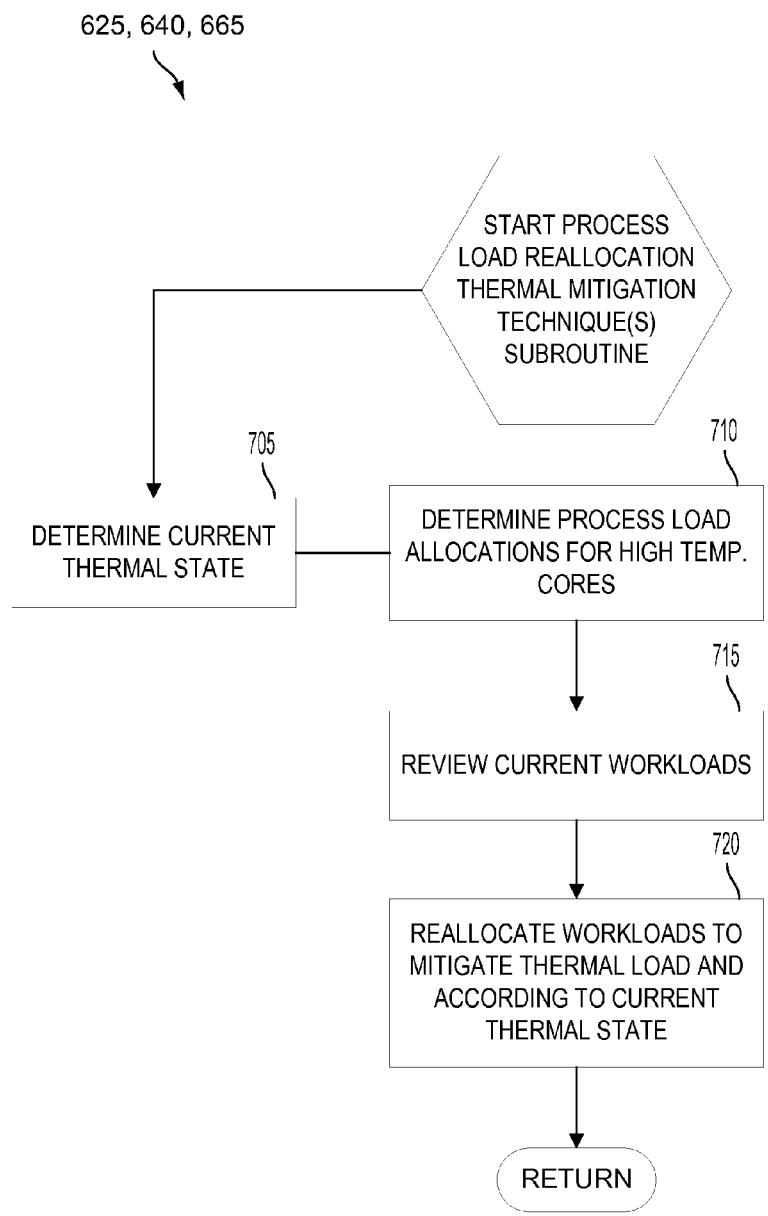
FIG. 12 is a logical flowchart illustrating a sub-method or subroutine for applying process load reallocation thermal mitigation techniques.

FIG. 12 is a logical flowchart illustrating sub-method or subroutines 625, 640, and 665 for applying process load reallocation thermal mitigation techniques. Block 705 is the first step in the submethod or subroutine for applying process load reallocation thermal mitigation techniques. In this first block 705, the thermal policy manager 101 may determine the current thermal state based on temperature readings provided by thermal sensors 157 most proximate to the various CPU and/or GPU cores. Once the current thermal state is determined by the thermal policy manager 101, in block 710 the thermal policy manager 101 may then review the current process load allocations for the various cores associated with the temperature readings. Next, in block 715, the thermal policy manager 101 may review the current workloads of one or more available, or otherwise underutilized, hardware and/or software modules.

Next, in block 720, the thermal policy manager 101 may reallocate or issue commands to reallocate the current workloads among the various cores, in order to reduce workload or to shift the workload. The proportion of processing load reallocation, the particular portion of process load which is reallocated and the processing location to which load is reallocated, may be accomplished according to the current thermal state determined by the thermal policy manager 101. Advantageously, by reducing workload in a core, or area of a core, that is associated with a high temperature reading through reallocation of all or part of the workload to another core or area, thermal energy generation can be mitigated.

So, for the second or QoS thermal state 310, in block 720, the thermal policy manager 101 may initiate or request the monitor module 114 and/or operating system ("O/S") module 207 of FIG. 2A to start applying thermal mitigation techniques but with the objective to maintain high-performance with little or no perception in degradations to the quality of service as perceived by the operator of the PCD 100.

According to this exemplary second thermal state 310 illustrated in FIG. 9, the thermal policy manager 101 may request the monitor 114 and/or the O/S module 207 to initiate thermal mitigation techniques such as, but not limited to, (1) load scaling and/or (2) load dynamic scaling and/or (3) spatial load shifting and/or (4) process load reallocation as described above.

For the third or severe thermal state 315, in block 720, the thermal policy manager 101 may start continuous monitoring, polling, or receiving interrupts from thermal sensors 157 so that temperature is sensed more continuously/frequently compared to the second lower thermal state 310. In this exemplary thermal state 315, the thermal policy manager 101 may apply or request that the monitor module 114 and/or 0/S module 207 apply more aggressive thermal mitigation techniques and/or additional thermal mitigation techniques (relative to the second thermal state 310) with probable perceivable degradation of performance observed by an operator of the PCD 100. According to this exemplary thermal state 315, the thermal policy manager 101 may cause reduction in power to one or more hardware devices like amplifiers, processors, etc or complete process load reallocation from high performance sub-processor blocks to lower power density main processor blocks.

The thermal policy manager 101 may also shift workloads among different hardware devices in a spatial manner, to bring active devices off-line and to bring inactive devices on-line. The thermal mitigation techniques of this third and severe thermal state 315 may be the same as those described above with respect to the second, quality of service thermal state 310. However, these same thermal mitigation techniques may be applied in a more aggressive manner, as described above.

For the fourth or critical thermal state 320, in block 720, this thermal state 320 may be similar to conventional techniques that are designed to eliminate functionality and operation of a PCD 100 in order to avoid critical temperatures. The fourth thermal state 320 may comprise a "critical" state in which the thermal policy manager 101 applies or triggers the shutting down of non-essential hardware and/or software. The temperature range for this fourth thermal state may include those of about 100° C. and above. The submethod 625, 640, or 665 then returns to an appropriate step in the thermal management method 600 depending upon the current thermal state of the PCD 100.

Figure 13A:
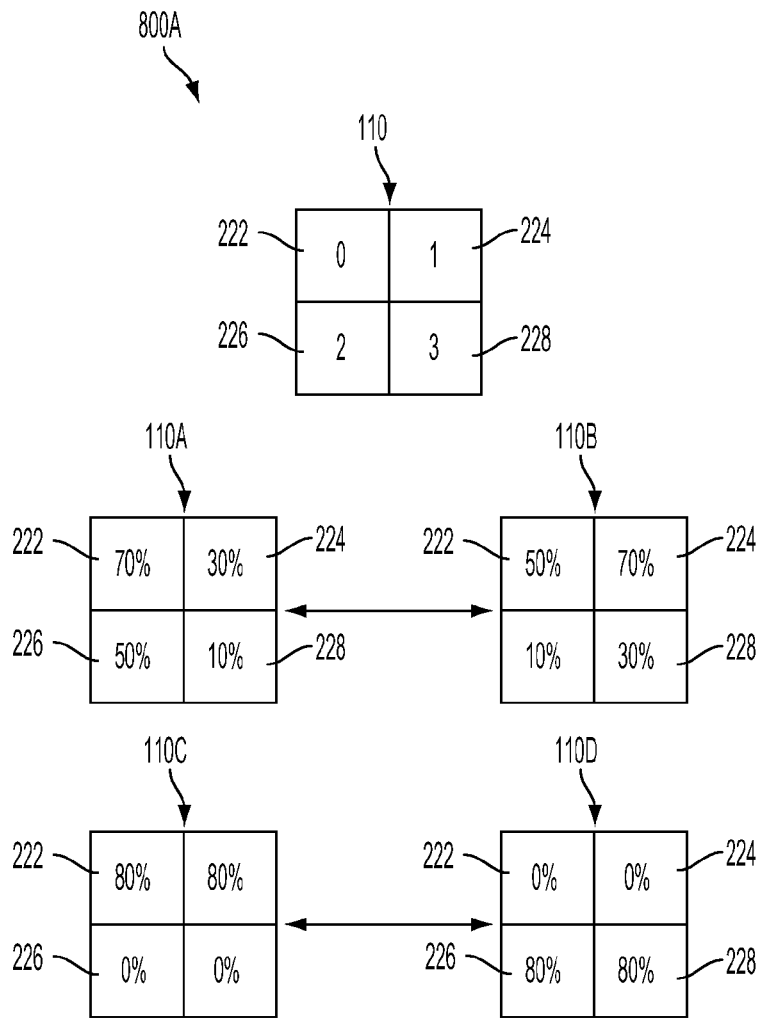
FIG. 13A is a schematic diagram for a four-core multi-core processor and different workloads that may be spatially managed with the multi-core processor.

FIG. 13A is a schematic 800A for a four-core multi-core processor 110 and different process loads that may be reallocated within the multi-core processor 110. The multi-core processor 110 may be a graphics processor 110 for supporting graphical content projected on the display 132 or a central processor 110 for execution of various applications.

The four-core multi-core processor 110 has a zeroth core 222, a first core 224, a second core 226, and a third core 228. The first process load scenario for the multi-core processor 110 is demonstrated by multi-core processor 110A in which the zeroth core 222 has a process workload of 70% (out of a 100% full work capacity/utilization for a particular core), while the first core 224 has a process workload of 30%, the second core 226 has a process workload of 50%, and the third core 228 has a process workload of 10%. If the thermal policy manager 101 enters any one of the thermal states 310, 315, 320 described above in which thermal mitigation techniques are applied to the PCD 100, a process reallocation thermal load mitigation technique as illustrated in this FIG. 13A may be implemented. According to this process reallocation thermal load mitigation technique, the thermal policy manager 101, the monitor module 114, and/or the O/S module 207 may shift the process workload of one core to one or more other cores in a multi-core processor 110.

In the exemplary embodiment illustrated in FIG. 13A, the process workload of the zeroth core 222 may be shifted such that additional work is performed by the remaining three other cores of the multi-core processor 110. Multi-core processor 110B illustrates such a shift in that 20% of the process workload for the zeroth core 222 and 40% of the process workload for the second core 226 were shifted among the remaining two cores such that the process workload experienced by the zeroth core 222 was reduced down to 50% while the process workload experienced by the second core 226 was reduced down to 10%. Meanwhile, the process workload of the first core 224 was increased to 70% while the process workload of the third core 228 was increased to 30%. One of ordinary skill in the art recognizes that other magnitudes and combinations of shifting workload and corresponding work load percentages are well within the scope of the invention.

The multi-core processors 110C-110D provide a demonstration of an exemplary shift of a "hole" in which one or more cores may effectively be cooled by letting them idle in a predetermined pattern or in a pattern dictated by thermal measurements. A 'hole' or core that is not being utilized is effectively moved in MIPS around a group of cores to cool surrounding cores in the course of several seconds. In the exemplary embodiment illustrated by multi-core processor 110C of FIG. 13A, the zeroth core 222 and the first core 224 may have exemplary workloads of 80% while the second core 226 and the third core 228 have no loads whatsoever. In this scenario, if either or both of the zeroth core 222 and first core 224 reach the second thermal state 310, the third thermal state 315, or the fourth thermal state 320, then the thermal policy manager 101 may apply or request that a process reallocation thermal load mitigation technique be applied in which all of the workload of the two active cores 222, 224 be shifted to the two inactive cores 226, 228. The fourth processor 110D demonstrates such a shift in which the zeroth core 222 and first core 224 no longer have any workloads while the second core 226 and third core 228 have assumed the previous workload which was managed by the zeroth core 222 and first core 224.

Figure 13B:
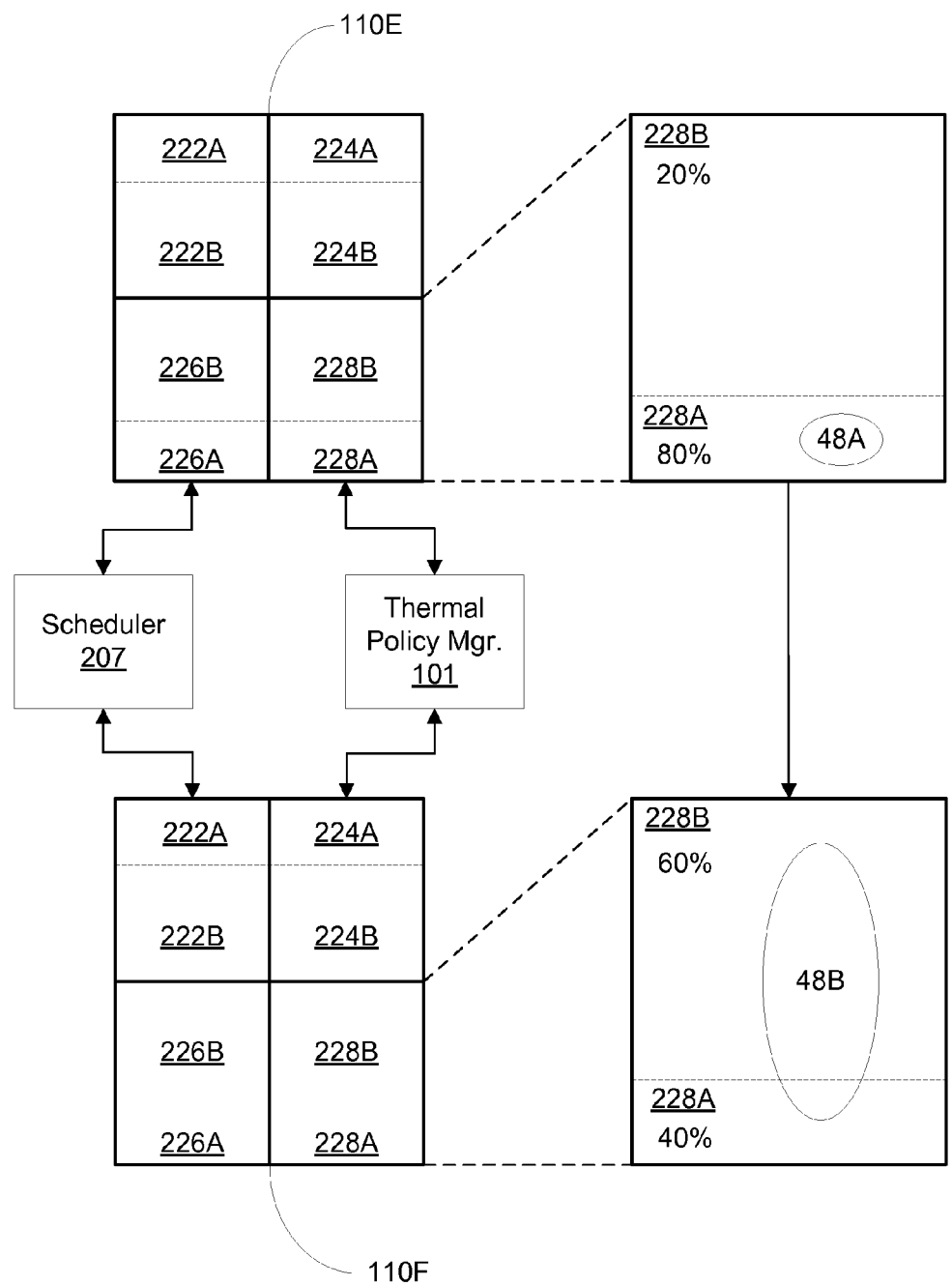
FIG. 13B is a schematic diagram for a four-core multi-core processor and thermal energy dissipation hotspots that may be managed from process load reallocation algorithms with the multi-core processor.

In FIG. 13B, the multi-core processors 110E-110F provide a demonstration of the exemplary FIG. 12 process load reallocation thermal mitigation technique. The FIG. 12 process load reallocation thermal mitigation technique is applied within a given core 228 such that a hotspot 48A within the core 228 may be effectively distributed over an increased area to form hotspot 48B. Advantageously, by reallocating a process load burden from a high powered sub-processor block 228A to a main processor block 228B, hotspot 48A, which has a high rate of energy dissipation per unit area, may be transformed into hotspot 48B which has a lower rate of energy dissipation per unit area. The energy dissipation per unit area (and, thus, the temperature per unit area) may be lower for hotspot 48B because the processing area used to process the reallocated task has a lower power density per unit area than the high power density sub-processor. Additionally, the energy dissipation per unit area may also be lower for hotspot 48B than hotspot 48A because the reallocated processing task takes longer to complete, thus necessitating that less energy be dissipated per unit of area over a given unit of time.

Returning to a previous example, thermal energy generation associated with a process load may be mitigated by reallocation of the process load. An embodiment that includes a CPU 110E, 110F having a core 228 with a main processing block 228B and higher performing, sub-processor block 228A, may have a main processing block 228B that represents three-fourths of the CPU 110E area and sub-processor block 228A that represents the remaining quarter of the CPU 110E, 110F area. The main processor block 228B may have an associated power density ("PD") that dissipates one-half of the total power of the overall CPU 110E, 110F while the sub-processor block 228A having increased computational power relative to the main processor also has an associated power density that dissipates one-half of the total power.

In such an exemplary case, one of ordinary skill in the art will recognize that the sub-processor block 228A, which provides increased computational power to the overall CPU 110E, 110F represents a power density that is over twice that of the larger main processing block 228B [$PD_{228A}$=(P/2)/(A/4)=2 P/A; $PD_{228B}$=(P/2)/(3A/4)=⅔ of P/A] and, because power density is directly proportional to the generation of thermal energy, for a given processing load the sub-processor block 228A will cause the dissipation of more thermal energy than main processing block 228B.

As illustrated by CPU 110E, sub-processor block 228A is processing 80% of a given process load such as, for example, a gaming application while main processor block 228B is processing a modest 20% remainder of the process load. Advantageously, the increased computational power associated with sub-processor block 228A (relative to the main processing block 228B) may establish an allocation bias for high computational applications from the scheduler 207, thus explaining the 80% process load burden being allocated to sub-processor block 228A. That is, because sub-processor block 228A is high powered, the default action from the scheduler 207 may be to allocate any application requiring high computational power to sub-processor 228A. However, excess or prolonged processing demands on sub-processor block 228A may generate excess thermal energy, as represented in the illustration by hotspot 48A. For purposes of illustration, hotspot 48A may be on the order of 80° C., a temperature perhaps associated with the threshold to severe state 315.

As previously described, sensors 157 placed near CPU 110E or even, more specifically, near processor core 228 may read hotspot 48A and subsequently trigger thermal policy manager module 101 to initiate a thermal mitigation technique including process load reallocation. One of ordinary skill in the art will realize that process load reallocation from a high power density sub-processor 228A to a lower power density main processor 228B will serve to lower the aggregate thermal dissipation across the core. Moreover, it is envisioned that the thermal policy manager module 101, when triggered by temperature readings of various cores or areas within cores, may direct the O/S scheduler to assign new processing loads, or reallocate existing processing loads, based on a thermal bias factor associated with core temperatures. That is, based on the real-time temperature readings of the various processing cores or core sub-areas, it is envisioned that a thermal bias factor may be assigned to the various processing cores or core sub-areas such that processing load burdens are allocated, or reallocated in a manner that manages thermal energy generation without overly sacrificing user experience or device performance. Moreover, in an effort to ensure that QoS remains at its highest level without jeopardizing component integrity, it is envisioned that a bias factor may be included in some embodiments that serves to drive processing burdens to the higher power density sub-cores.

After reallocation of the process load, core 228 of CPU 110F may have a workload allocation of 60% to main processor block 228B and 40% to sub-processor block 228A. In the illustration, the reduction of processing burden from the high PD sub-processor block 228A and the relative increase of processing burden to the lower PD main processor block 228B inevitably caused a reduction in QoS. However, the reallocation of the process burden, or a portion thereof, to the lower PD main processor block 228B caused the generation of thermal energy to be spread across a larger area or footprint of the core 228 thus creating a larger area with a decreased temperature per unit of area relative to the previous smaller area, as is illustrated by the "cooler" and larger hotspot 48B. For purposes of illustration, hotspot 48B may be on the order of 50° C., a temperature perhaps associated with the threshold to normal state 305.

From the FIG. 13B example, it can be seen that embodiments utilizing thermal load steering parameter(s) to reallocate processing loads from one component to another, such as, for example, from a sub-processor block of core 228 to a main processor block of core 228, may realize the benefit of lower temperatures associated with thermal energy dissipation over a larger area for what may be a relatively minor tradeoff of processing performance. The main processor blocks 228B may process the load more slowly, thus translating to a lower QoS, but dissipate the thermal energy associated with a given workload over a larger area and longer time compared to the sub-processors 228A, thereby possibly avoiding critical temperatures in PCD 100.

Figure 14:
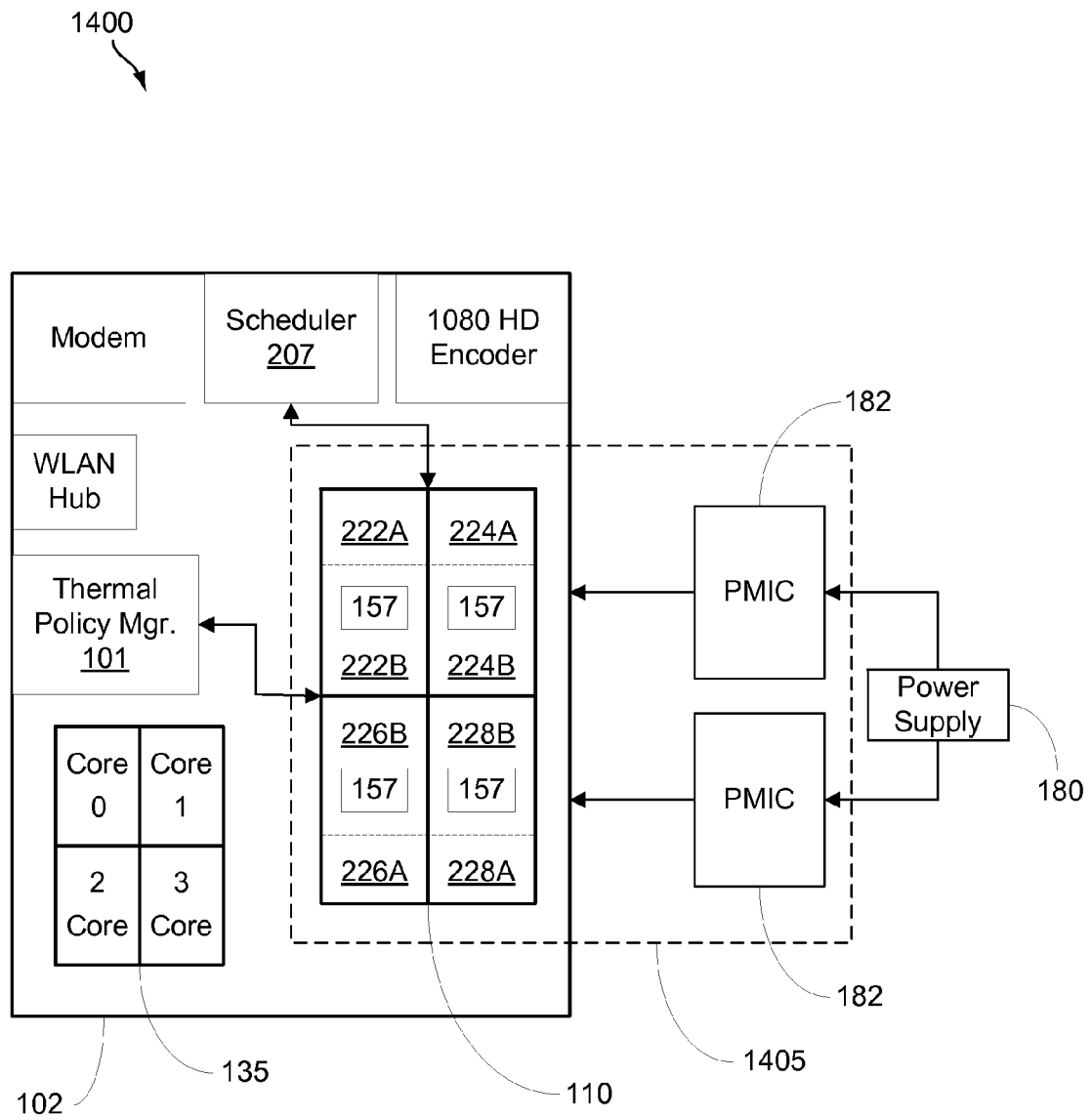
FIG. 14 is a functional block diagram illustrating an exemplary spatial arrangement of hardware for the chip illustrated in FIG. 6 and exemplary components external to the chip illustrated in FIG. 6.

FIG. 14 illustrates an exemplary floor plan 1400 of an application specific integrated circuit ("ASIC") 102 that may benefit from the application of various thermal mitigation techniques such as those described above. In the FIG. 14 illustration, GPU bank 135 and CPU bank 110 represent the primary components generating thermal energy on ASIC 102. Power management integrated circuits ("PMICs") 182, for example, do not reside on ASIC 102, but are represented as being in near proximity 1405 to CPU bank 110. For example, due to limited physical space within a PCD 100, PMICs 182 may reside immediately behind and adjacent to ASIC 102. As such, one of ordinary skill in the art will recognize that thermal energy dissipated from a PMIC 182, or other heat generating component, may adversely affect temperature readings taken from sensors 157 on any of cores 222, 224, 226, 228 within CPU 110.

PMICs 182, as well as other components residing within PCD 100, may be placed in immediate proximity 1405 to a given processing core, thereby generating a bias in the processing core for a higher average operating temperature when the thermal energy dissipated from the components propagates through the core. One of ordinary skill in the art will recognize that the adverse affect of these proximate components on processing core temperature can be difficult to predict or simulate across various PCD 100 configurations and/or use cases. As such, one of ordinary skill in the art will also recognize that an advantage of thermal mitigation algorithms that can be leveraged in real-time, or near real-time, is that temperature bias in processing components which may result from adjacent components within PCD 100, such as the exemplary PMICs 182, can be accommodated without custom configurations or pre-generated thermal load steering scenarios and parameters. That is, processing loads can be allocated, or reallocated in real-time based on real-time, actual temperature readings.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for managing thermal energy generation in a computing device, the method comprising:

placing a temperature sensor at a distance from a thermal energy generating component of a chip in the computing device, wherein the distance correlates with a predetermined drop in temperature with respect to a hotspot in the thermal energy generating component;

monitoring, at a first rate, temperature readings generated by the temperature sensor, wherein the temperature readings correlate to a process load within the thermal energy generating component; and based on a first monitored temperature reading, reallocating a process load portion from a first processing area of the thermal energy generating component to a second processing area of the thermal energy generating component, wherein reallocation of the process load portion serves to lower the amount of thermal energy generated at any unit area of the component over a unit of time.

2. The method of claim 1, wherein the distance is a predicted distance based on a computer simulation, and further comprising:

based on a second monitored temperature reading, reallocating a process load portion from the second processing area of the thermal energy generating component to the first processing area of the thermal energy generating component.

3. The method of claim 2, wherein the second monitored temperature reading indicates that the temperature of the first processing area has cooled relative to the first monitored temperature reading.

4. The method of claim 1, wherein the reallocated process load portion equals about one-hundred percent of the process load in the first processing area.

5. The method of claim 1, wherein the first processing area is a sub-processor within a core which also contains the second processing area.

6. The method of claim 1, wherein the first processing area has an associated power density that exceeds the power density associated with the second processing area.

7. The method of claim 1, further comprising:

defining a plurality of thermal states, wherein each thermal state contains a range of temperatures; and wherein the first monitored temperature reading indicates that the temperature of the thermal energy generating component has increased from a temperature contained in a first thermal state to a temperature contained in a second thermal state.

8. The method of claim 7, further comprising:

based on a second monitored temperature reading, reallocating a process load portion from the second processing area of the thermal energy generating component to the first processing area of the thermal energy generating component, wherein the second monitored temperature reading indicates that the temperature of the thermal energy generating component has decreased from a temperature contained in the second thermal state to a temperature contained in the first thermal state.

9. The method of claim 7, wherein the amount of load to be reallocated from the first processing area to the second processing area varies according to the thermal state which contains the first monitored temperature reading.

10. The method of claim 7, further comprising increasing the rate of monitoring from the first rate to a second rate, wherein the increased rate of monitoring is triggered by the first monitored temperature reading.

11. A computer system for managing thermal energy generation in a computing device, the system comprising:

a temperature sensor placed at a distance from a core of a processor of the computer system, wherein the distance correlates with a predetermined drop in temperature with respect to a hotspot in the core of the processor; and the processor operable to:

monitor, at a first rate, temperature readings generated by the temperature sensor; and based on a first monitored temperature reading, reallocate a process load portion from a first processing area of the core to a second processing area of the core, wherein reallocation of the process load portion serves to lower the amount of energy generated at any unit area of the core over a unit of time.

12. The system of claim 11, wherein the distance is a predicted distance based on a computer simulation, and the processor is further operable to:

based on a second monitored temperature reading, reallocate a process load portion from the second processing area of the core to the first processing area of the core.

13. The system of claim 12, wherein the second monitored temperature reading indicates that the temperature of the first processing area has cooled relative to the first monitored temperature reading.

14. The system of claim 11, wherein the reallocated process load portion equals about one-hundred percent of the process load in the first processing area.

15. The system of claim 11, wherein the first processing area is a sub-processor within the core.

16. The system of claim 11, wherein the first processing area has an associated power density that exceeds the power density associated with the second processing area.

17. The system of claim 11, wherein the processor is further operable to recognize a plurality of thermal states, wherein:

each thermal state contains a range of temperatures; and the first monitored temperature reading indicates that the temperature of the core has increased from a temperature contained in a first thermal state to a temperature contained in a second thermal state.

18. The system of claim 17, wherein the processor is further operable to:

based on a second monitored temperature reading, reallocate a process load portion from the second processing area of the core to the first processing area of the core, wherein the second monitored temperature reading indicates that the temperature of the core has decreased from a temperature contained in the second thermal state to a temperature contained in the first thermal state.

19. The system of claim 17, wherein the amount of load reallocated from the first processing area to the second processing area varies according to the thermal state which contains the first monitored temperature reading.

20. The system of claim 17, wherein the processor is further operable to increase the rate of monitoring from the first rate to a second rate, wherein the increased rate of monitoring is triggered by the first monitored temperature reading.

21. A computer system for managing thermal energy generation in a computing device, the system comprising:

means for temperature sensing placed at a distance from a thermal energy generating component of a chip in the computing device, wherein the distance correlates with a predetermined drop in temperature with respect to a hotspot in the thermal energy generating component;

means for monitoring, at a first rate, temperature readings generated by the means for temperature sensing; and means for reallocating a process load portion from a first processing area of the thermal energy generating component to a second processing area of the thermal energy generating component, wherein reallocation of the process load portion is triggered by a first monitored temperature reading and serves to lower the amount of energy generated at any unit area of the component over a unit of time.

22. The system of claim 21, wherein the distance is a predicted distance based on a computer simulation, and further comprising:

means for reallocating a process load portion from the second processing area of the thermal energy generating component to the first processing area of the thermal energy generating component, wherein reallocation of the process load portion is triggered by a second monitored temperature reading.

23. The system of claim 22, wherein the second monitored temperature reading indicates that the temperature of the first processing area has cooled relative to the first monitored temperature reading.

24. The system of claim 21, wherein the reallocated process load portion equals about one-hundred percent of the process load in the first processing area.

25. The system of claim 21, wherein the first processing area is a sub-processor within a core which also contains the second processing area.

26. The system of claim 21, wherein the first processing area has an associated power density that exceeds the power density associated with the second processing area.

27. The system of claim 21, further comprising:

means for defining a plurality of thermal states, wherein each thermal state contains a range of temperatures; and wherein the first monitored temperature reading indicates that the temperature of the thermal energy generating component has increased from a temperature contained in a first thermal state to a temperature contained in a second thermal state.

28. The system of claim 27, further comprising:

means for reallocating a process load portion from the second processing area of the thermal energy generating component to the first processing area of the thermal energy generating component, wherein reallocation of the process load portion is triggered by the second monitored temperature reading and the second monitored temperature reading indicates that the temperature of the thermal energy generating component has decreased from a temperature contained in the second thermal state to a temperature contained in the first thermal state.

29. The system of claim 27, wherein the amount of load reallocated from the first processing area to the second processing area varies according to the thermal state which contains the first monitored temperature reading.

30. The system of claim 27, further comprising means for increasing the rate of monitoring from the first rate to a second rate, wherein the increased rate of monitoring is triggered by the first monitored temperature reading.

31. A computer program product comprising a non-transitory computer usable medium having a computer readable program code embodied therein, said computer readable program code adapted to be executed to implement a method for managing thermal energy generation in a computing device, said method comprising:

placing a temperature sensor at a distance from a thermal energy generating component of a chip in the computing device, wherein the distance correlates with a predetermined drop in temperature with respect to a hotspot in the thermal energy generating component;

monitoring, at a first rate, temperature readings generated by the temperature sensor; and based on a first monitored temperature reading, reallocating a process load portion from a first processing area of the thermal energy generating component to a second processing area of the thermal energy generating component, wherein reallocation of the process load portion serves to lower the amount of energy generated at any unit area of the component over a unit of time.

32. The computer program product of claim 31, wherein the distance is a predicted distance based on a computer simulation, and wherein the program code implementing the method further comprises:

based on a second monitored temperature reading, reallocating a process load portion from the second processing area of the thermal energy generating component to the first processing area of the thermal energy generating component.

33. The computer program product of claim 32, wherein the second monitored temperature reading indicates that the temperature of the first processing area has cooled relative to the first monitored temperature reading.

34. The computer program product of claim 31, wherein the reallocated process load portion equals about one-hundred percent of the process load in the first processing area.

35. The computer program product of claim 31, wherein the first processing area is a sub-processor within a core which also contains the second processing area.

36. The computer program product of claim 31, wherein the first processing area has an associated power density that exceeds the power density associated with the second processing area.

37. The computer program product of claim 31, wherein the program code implementing the method further comprises:

defining a plurality of thermal states, wherein each thermal state contains a range of temperatures; and wherein the first monitored temperature reading indicates that the temperature of the thermal energy generating component has increased from a temperature contained in a first thermal state to a temperature contained in a second thermal state.

38. The computer program product of claim 37, wherein the program code implementing the method further comprises:

based on a second monitored temperature reading, reallocating a process load portion from the second processing area of the thermal energy generating component to the first processing area of the thermal energy generating component, wherein the second monitored temperature reading indicates that the temperature of the thermal energy generating component has decreased from a temperature contained in the second thermal state to a temperature contained in the first thermal state.

39. The computer program product of claim 37, wherein the amount of load to be reallocated from the first processing area to the second processing area varies according to the thermal state which contains the first monitored temperature reading.

40. The computer program product of claim 37, wherein the program code implementing the method further comprises increasing the rate of monitoring from the first rate to a second rate, wherein the increased rate of monitoring is triggered by the first monitored temperature reading.

\* \* \* \* \*